(12) United States Patent
Horn et al.

(10) Patent No.: US 11,616,560 B2
(45) Date of Patent: Mar. 28, 2023

(54) MEASUREMENT REPORTING FOR FULL-DUPLEX MULTI-BEAM COMMUNICATIONS

(71) Applicant: QUALCOMM Incorporated, San Diego, CA (US)

(72) Inventors: Idan Michael Horn, Hod Hasharon (IL); Ran Berliner, Kfar-Aviv (IL); Assaf Touboul, Netanya (IL); Shay Landis, Hod Hasharon (IL)

(73) Assignee: QUALCOMM Incorporated, San Diego, CA (US)

(*) Notice: Subject to any disclaimer, the term of this patent is extended or adjusted under 35 U.S.C. 154(b) by 42 days.

(21) Appl. No.: 17/317,028

(22) Filed: May 11, 2021

(65) Prior Publication Data
US 2022/0077913 A1 Mar. 10, 2022

Related U.S. Application Data

(60) Provisional application No. 63/075,725, filed on Sep. 8, 2020.

(51) Int. Cl.
*H04B 7/06* (2006.01)
*H04B 17/318* (2015.01)
*H04B 7/0408* (2017.01)
*H04L 5/14* (2006.01)

(52) U.S. Cl.
CPC ......... *H04B 7/0695* (2013.01); *H04B 7/0408* (2013.01); *H04B 17/318* (2015.01); *H04L 5/14* (2013.01)

(58) Field of Classification Search
CPC .................................................... H04B 7/0695
See application file for complete search history.

(56) References Cited

U.S. PATENT DOCUMENTS

| 2018/0083679 | A1  | 3/2018  | Lim et al. |
| 2018/0132252 | A1* | 5/2018  | Islam ................... H04W 72/046 |
| 2019/0357064 | A1* | 11/2019 | Hosseini ............... H04W 24/04 |

FOREIGN PATENT DOCUMENTS

| WO | WO-2018023086 A1 | 2/2018 |
| WO | WO-2019140646 A1 * | 7/2019 |

OTHER PUBLICATIONS

International Search Report and Written Opinion—PCT/US2021/039904—ISA/EPO—dated Oct. 7, 2021.

* cited by examiner

*Primary Examiner* — Hsinchun Liao
(74) *Attorney, Agent, or Firm* — Holland & Hart LLP

(57) ABSTRACT

Methods, systems, and devices for wireless communications are described. A user equipment (UE) may identify a first set of signal strength metrics for signal strengths of transmit beams of a base station using receive beams of the UE. The UE may identify a second set of signal strength metrics for signal strengths of transmit beams of the UE using receive beams of the UE. The UE may transmit an indication of the first set of signal strength metrics and the second set of signal strength metrics to the base station. The UE may communicate with the base station based at least in part on the indication.

30 Claims, 18 Drawing Sheets

| Signal RSRP | | BS Tx Beam 0 | BS Tx Beam 1 | BS Tx Beam 2 | BS Tx Beam 3 | BS Tx Beam 4 | BS Tx Beam 5 | BS Tx Beam 6 | BS Tx Beam 7 |
|---|---|---|---|---|---|---|---|---|---|
| UE Rx Panel 0 | Rx Beam 0 @ Panel 0 | | | | | ▨ | ▧ | ▦ | |
| | Rx Beam 1 @ Panel 0 | ▨ | | | | | | ▦ | ▧ |
| | Rx Beam 2 @ Panel 0 | ▨ | | ▧ | | | | ▦ | ▨ |
| | Rx Beam 3 @ Panel 0 | | | ▨ | ▦ | | | | |
| UE Rx Panel 1 | Rx Beam 0 @ Panel 1 | ▦ | | | | | ▧ | | |
| | Rx Beam 1 @ Panel 1 | | | | | ▨ | | | ▦ |
| | Rx Beam 2 @ Panel 1 | | | ▧ | ▦ | | | | ▦ |
| | Rx Beam 3 @ Panel 1 | | ▨ | | ▦ | | ▨ | | |
| UE Rx Panel 2 | Rx Beam 0 @ Panel 2 | | | | | | | ▧ | |
| | Rx Beam 1 @ Panel 2 | | | | | | | | |
| | Rx Beam 2 @ Panel 2 | | ▨ | | | | | | ▧ |
| | Rx Beam 3 @ Panel 2 | | | | ▨ | | | | ▧ |

MEASUREMENT REPORTING FOR FULL-DUPLEX MULTI-BEAM COMMUNICATIONS

CROSS REFERENCE

The present Application for Patent claims the benefit of U.S. Provisional Patent Application No. 63/075,725 by HORN et al., entitled "MEASUREMENT REPORTING FOR FULL-DUPLEX MULTI-BEAM COMMUNICATIONS" and filed Sep. 8, 2020, which is assigned to the assignee hereof and expressly incorporated by reference herein.

FIELD OF TECHNOLOGY

The following relates to wireless communications, including measurement reporting for full-duplex multi-beam communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, communication devices (e.g., base stations, UEs) may support full-duplex communications. In some cases, full-duplex communications may increase interference and self-interference experienced by a communication device.

SUMMARY

The described techniques relate to improved methods, systems, devices, and apparatuses that support measurement reporting for full-duplex multi-beam communications. Generally, the described techniques provide for the capturing and utilization of base station interference and UE self-interference metrics for beam and/or link management/optimization. A UE may identify and transmit both base station interference as well as UE self-interference information to the base station. Generally, the base station interference (e.g., a first set of signal strength metrics) may include the UE measuring performance metrics (e.g., reference signal received power (RSRP), reference signal strength indicator (RSSI), signal-to-noise ratio (SNR), channel quality information (CQI), throughput rates, etc.) for transmit beams of the base station when received using different receive beams of the UE (e.g., on a per-receive beam of the UE basis for each or a subset of available transmit beams of the base station). The UE self-interference (e.g., a second set of signal strength metrics) may include the UE measuring performance metrics (e.g., RSRP, RSSI, SNR, CQI, throughput rates, etc.) for transmit beams of the UE when received using different receive beams of the UE (e.g., on a per-receive beam of the UE basis for each or a subset of available transmit beams of the UE). The UE may transmit actual RSRP values (or RSSI, SNR, CQI, etc.), a flag indicating whether the measured transmit/receive beam pair satisfies or fails to satisfy a threshold, and the like.

The base station may use this information (as well as similar information from other UEs) for link management/optimization, beam management/optimization, etc., for the UE and/or other UEs. For example, the base station may schedule or otherwise configure the UE to receive downlink signaling via one or more pairs of base station transmit beams and UE receive beams that exhibit high signal strength (e.g., high RSRP values) in combination, and the base station may generally choose to schedule or otherwise configure the UE to concurrently transmit uplink signaling via one or more UE transmit beams that exhibit low signal strength (e.g., low RSRP values) in combination with the one or more receive beams of the UE configured for downlink reception. Accordingly, the combination of both tables (e.g., the first and second sets of signal strength metrics) will provide an indication not only of how strongly different base station transmit beams are received using different UE receive beams, but also of how strongly different UE transmit beams self-interfere with the different UE receive beams, and thus reception and use by the base station of such information when making management/optimization determinations (e.g., scheduling and other configuration determinations) may improve such management/optimization determinations. The UE(s) may then communicate with the base station using transmit/receive beam pairs selected based on the information.

A method of wireless communication at a UE is described. The method may include identifying a first set of signal strength metrics for signal strengths of transmit beams of a base station using receive beams of the UE, identifying a second set of signal strength metrics for signal strengths of transmit beams of the UE using receive beams of the UE, transmitting an indication of the first set of signal strength metrics and the second set of signal strength metrics to the base station, and communicating with the base station based on the indication.

An apparatus for wireless communication at a UE is described. The apparatus may include a processor, memory coupled with the processor, and instructions stored in the memory. The instructions may be executable by the processor to cause the apparatus to identify a first set of signal strength metrics for signal strengths of transmit beams of a base station using receive beams of the UE, identify a second set of signal strength metrics for signal strengths of transmit beams of the UE using receive beams of the UE, transmit an indication of the first set of signal strength metrics and the second set of signal strength metrics to the base station, and communicate with the base station based on the indication.

Another apparatus for wireless communication at a UE is described. The apparatus may include means for identifying a first set of signal strength metrics for signal strengths of transmit beams of a base station using receive beams of the UE, identifying a second set of signal strength metrics for signal strengths of transmit beams of the UE using receive beams of the UE, transmitting an indication of the first set of signal strength metrics and the second set of signal strength metrics to the base station, and communicating with the base station based on the indication.

A non-transitory computer-readable medium storing code for wireless communication at a UE is described. The code may include instructions executable by a processor to identify a first set of signal strength metrics for signal strengths of transmit beams of a base station using receive beams of the UE, identify a second set of signal strength metrics for signal strengths of transmit beams of the UE using receive beams of the UE, transmit an indication of the first set of signal strength metrics and the second set of signal strength metrics to the base station, and communicate with the base station based on the indication.

Some examples of the method, apparatuses, and non-transitory computer-readable medium described herein may further include operations, features, means, or instructions for measuring a signal strength of a reference signal transmitted by the base station via a set of transmit beams of the base station, where the measuring may be on a per-receive beam of the UE basis and the first set of signal strength metrics include a result of the measuring.

Some examples of the method, apparatuses, and non-transitory computer-readable medium described herein may further include operations, features, means, or instructions for receiving, from the base station, a configuration signal identifying reference signal resources for the reference signal transmissions by the base station.

Some examples of the method, apparatuses, and non-transitory computer-readable medium described herein may further include operations, features, means, or instructions for measuring a signal strength of a reference signal transmitted by the UE via a set of transmit beams of the UE, where the measuring may be on a per-receive beam of the UE basis and the second set of signal strength metrics include a result of the measuring.

Some examples of the method, apparatuses, and non-transitory computer-readable medium described herein may further include operations, features, means, or instructions for receiving, from the base station, a configuration signal identifying resources for the reference signal transmissions by the UE.

Some examples of the method, apparatuses, and non-transitory computer-readable medium described herein may further include operations, features, means, or instructions for generating a base station-to-UE interference table including a respective signal strength of a set of transmit beams of the base station for a set of receive beams of the UE, and generating a UE self-interference table including a respective signal strength of a set of transmit beams of the UE for the set of receive beams of the UE, where the indication of the first set of signal strength metrics includes information associated with the base station-to-UE interference table and the UE self-interference table.

In some examples of the method, apparatuses, and non-transitory computer-readable medium described herein, the information associated with the base station-to-UE interference table and the UE self-interference table includes the respective signal strengths.

In some examples of the method, apparatuses, and non-transitory computer-readable medium described herein, the information associated with the base station-to-UE interference table and the UE self-interference table includes a respective indication, for each base station transmit beam-to-UE receive beam combination of the base station-to-UE interference table, for each UE transmit beam-to-UE receive beam combination of the UE self-interference table, or both, of whether the respective signal strength satisfies a threshold.

In some examples of the method, apparatuses, and non-transitory computer-readable medium described herein, the information associated with the base station-to-UE interference table and the UE self-interference table includes a respective indication for any base station transmit beam-to-UE receive beam combination of the base station-to-UE interference table, for any UE transmit beam-to-UE receive beam combination of the UE self-interference table, or both, associated with a signal strength that fails to satisfy a threshold.

A method of wireless communication at a base station is described. The method may include receiving, from a UE, an indication of a first set of signal strength metrics for signal strengths of transmit beams of the base station using receive beams of the UE and a second set of signal strength metrics for signal strengths of transmit beams of the UE using receive beams of the UE, selecting one or more transmit beams of the base station to use for communicating with the UE based on the indication, and communicating with the UE based on the selecting.

An apparatus for wireless communication at a base station is described. The apparatus may include a processor, memory coupled with the processor, and instructions stored in the memory. The instructions may be executable by the processor to cause the apparatus to receive, from a UE, an indication of a first set of signal strength metrics for signal strengths of transmit beams of the base station using receive beams of the UE and a second set of signal strength metrics for signal strengths of transmit beams of the UE using receive beams of the UE, select one or more transmit beams of the base station to use for communicating with the UE based on the indication, and communicate with the UE based on the selecting.

Another apparatus for wireless communication at a base station is described. The apparatus may include means for receiving, from a UE, an indication of a first set of signal strength metrics for signal strengths of transmit beams of the base station using receive beams of the UE and a second set of signal strength metrics for signal strengths of transmit beams of the UE using receive beams of the UE, selecting one or more transmit beams of the base station to use for communicating with the UE based on the indication, and communicating with the UE based on the selecting.

A non-transitory computer-readable medium storing code for wireless communication at a base station is described. The code may include instructions executable by a processor to receive, from a UE, an indication of a first set of signal strength metrics for signal strengths of transmit beams of the base station using receive beams of the UE and a second set of signal strength metrics for signal strengths of transmit beams of the UE using receive beams of the UE, select one or more transmit beams of the base station to use for communicating with the UE based on the indication, and communicate with the UE based on the selecting.

Some examples of the method, apparatuses, and non-transitory computer-readable medium described herein may further include operations, features, means, or instructions for determining, based on the first set of signal strength metrics, a signal strength of a reference signal transmitted by the base station using a set of transmit beams of the base station, where the signal strength may be on a per-receive beam of the UE basis.

Some examples of the method, apparatuses, and non-transitory computer-readable medium described herein may further include operations, features, means, or instructions for transmitting a configuration signal identifying reference signal resources for the reference signal transmissions by the base station.

Some examples of the method, apparatuses, and non-transitory computer-readable medium described herein may further include operations, features, means, or instructions for determining, based on the second set of signal strength metrics, a signal strength of a reference signal transmitted by the UE using a set of transmit beams of the UE, where the signal strength may be on a per-receive beam of the UE basis.

Some examples of the method, apparatuses, and non-transitory computer-readable medium described herein may further include operations, features, means, or instructions for transmitting, to the UE, a configuration signal identifying resources for the reference signal transmissions by the UE.

Some examples of the method, apparatuses, and non-transitory computer-readable medium described herein may further include operations, features, means, or instructions for generating, based on the first set of signal strength metrics, a base station-to-UE interference table including a respective signal strength of a set of transmit beams of the base station for a set of receive beams of the UE, and generating, based on the second set of signal strength metrics, a UE self-interference table including a respective signal strength of a set of transmit beams of the UE for the set of receive beams of the UE.

In some examples of the method, apparatuses, and non-transitory computer-readable medium described herein, the indication includes the respective signal strengths associated with the base station-to-UE interference table and the UE self-interference table.

In some examples of the method, apparatuses, and non-transitory computer-readable medium described herein, the indication includes a respective indication of whether a signal strength associated with each base station transmit beam-to-UE receive beam combination of the combination of the base station-to-UE interference table, each UE transmit beam-to-UE receive beam combination of the UE self-interference table, or both, satisfies a threshold.

In some examples of the method, apparatuses, and non-transitory computer-readable medium described herein, the indication includes a respective indication for any base station transmit beam-to-UE receive beam combination of the combination of the base station-to-UE interference table, for any UE transmit beam-to-UE receive beam combination of the UE self-interference table, or both, associated with a signal strength that fails to satisfy a threshold.

Some examples of the method, apparatuses, and non-transitory computer-readable medium described herein may further include operations, features, means, or instructions for receiving, from a second UE, an indication of a third set of signal strength metrics for signal strengths of transmit beams of the base station using receive beams of the second UE and a fourth set of signal strength metrics for signal strengths of transmit beams of the second UE using receive beams of the second UE, where selecting the one or more transmit beams of the base station to use for communicating with the UE may be based on the third set of signal strength metrics, the fourth set of signal strength metrics, or both.

BRIEF DESCRIPTION OF THE DRAWINGS

FIGS. 3A and 3B illustrate an example of a table configuration that supports measurement reporting for full-duplex multi-beam communications in accordance with aspects of the present disclosure.

FIG. 4 illustrates an example of a table configuration that supports measurement reporting for full-duplex multi-beam communications in accordance with aspects of the present disclosure.

DETAILED DESCRIPTION

Figure 1:
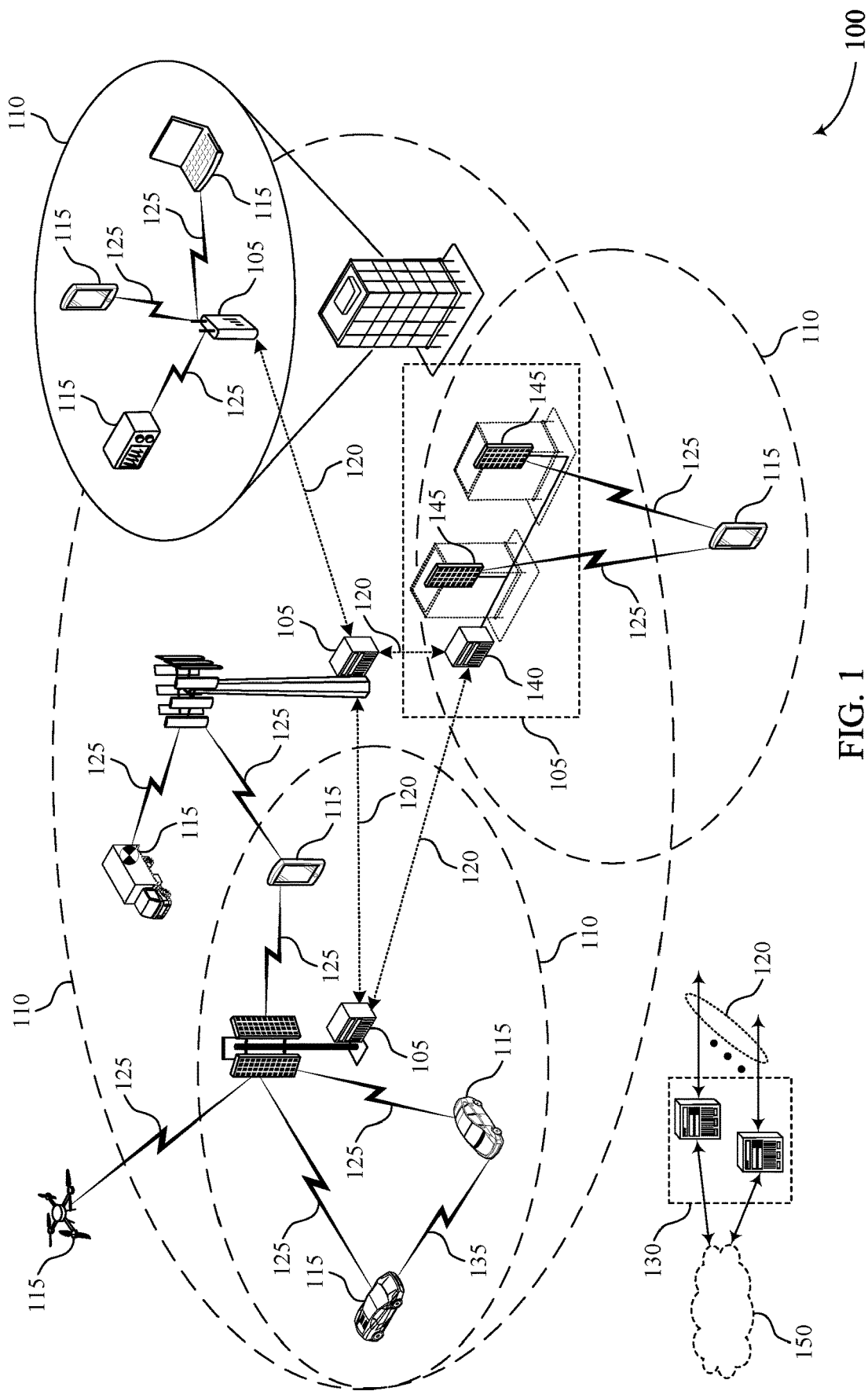
FIG. 1 illustrates an example of a system for wireless communications that supports measurement reporting for full-duplex multi-beam communications in accordance with aspects of the present disclosure.

Some wireless communications systems may use full-duplex wireless communications where devices (e.g., UE(s) and/or base station(s)) are able to transmit and receive at the same time. Such full-duplex communications may be enhanced using beamforming techniques (e.g., directional transmissions and/or receptions) where transmit/receive beam pairs are employed for the directional transmissions. In millimeter wave (mmW) and sub-terahertz (THz) frequency ranges, the number of antennal panels (e.g., panels consisting of antenna(s), antenna port(s), antenna configurations, beamforming configurations, etc.) may be leveraged to increase full-duplex communications, which supports more efficient beamforming spatial separation and therefore enhances full-duplex communications. Such wireless communication systems may use interference introduced from the base station performing transmissions to select the beam pair to be used for communications with different UE(s). However, such base station interference may not provide a comprehensive picture of the full interference experienced by the UE(s), e.g., due to UE transmissions. This may limit the effectiveness of beam management/optimization techniques.

Aspects of the disclosure are initially described in the context of wireless communications systems. Generally, the described techniques provide for the capturing and utilization of both base station interference and UE self-interference metrics for beam and/or link management/optimization. A UE may identify and transmit both base station interference as well as UE self-interference information to the base station. Generally, the base station interference (e.g., a first set of signal strength metrics) may include the UE measuring performance metrics (e.g., RSRP, RSSI, SNR, CQI, throughput rates, etc.) for transmit beams of the base station for receive beams of the UE (e.g., on a per-receive beam of the UE basis for each or a subset of available transmit beams of the base station). The UE self-interference (e.g., a second set of signal strength metrics) may include the UE measuring performance metrics (e.g., RSRP, RSSI, SNR, CQI, throughput rates, etc.) for transmit beams of the UE for receive beams of the UE (e.g., on a per-receive beam of the UE basis for each or a subset of available transmit beams of the UE). The UE may transmit actual RSRP values (or RSSI, SNR, CQI, etc.), a flag indicating whether the measured transmit/receive beam pair satisfies or fails to satisfy a threshold, and the like.

The base station may use this information (as well as similar information from other UEs) for link management/optimization, beam management/optimization, etc., for the UE and/or other UEs. For example, the base station may schedule or otherwise configure the UE to receive downlink signaling via one or more pairs of base station transmit beams and UE receive beams that exhibit high signal strength (e.g., high RSRP values) in combination, and the base station may generally choose to schedule or otherwise configure the UE to concurrently transmit uplink signaling via one or more UE transmit beams that exhibit low signal strength (e.g., low RSRP values) in combination with the one or more receive beams of the UE configured for downlink reception. If a particular UE transmit beam and a particular UE receive beam exhibit high signal strength in combination, this may correspond to a high degree of self-interference between those beams, and thus uplink transmission by the UE using the particular UE transmit beam may be undesirable if the particular UE receive beam is concurrently used for downlink reception, whereas a different UE transmit beam may be used for uplink signaling with relatively little self-interference as indicated by such beam combination exhibiting low signal strength. Accordingly, the combination of both tables (e.g., the first and second sets of signal strength metrics) will provide an indication not only of how strongly different base station transmit beams are received using different UE receive beams, but also of how strongly different UE transmit beams self-interfere with the different UE receive beams, and thus reception and use by the base station of such information when making management/optimization determinations (e.g., scheduling and other configuration determinations) may improve such management/optimization determinations. A base station may take into account such information as received from multiple UEs when making scheduling or other management determination regarding the beams to be used by any one UE for downlink or uplink communications (e.g., as what base station transmit beams are used for communications with one UE may impact what base station transmit beams are used for communications with another UE, and which may have further ripple effects into what UE receive beams and UE transmit beams are used by any particular UE. The UE(s) may then communicate with the base station using transmit/receive beam pairs selected based on the information.

Aspects of the disclosure are further illustrated by and described with reference to diagrams of apparatuses, diagrams of systems, and flowcharts that relate to measurement reporting for full-duplex multi-beam communications.

FIG. 1 illustrates an example of a wireless communications system 100 that supports measurement reporting for full-duplex multi-beam communications in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions). As described herein, a receiving device may in some cases concurrently transmit via one or more beams and concurrently receive via one or more other beams.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may identify a first set of signal strength metrics for signal strengths of different transmit beams of a base station 105 using different receive beams of the UE 115. The UE 115 may identify a second set of signal strength metrics for signal strengths of different transmit beams of the UE 115 using the different receive beams of the UE 115. The UE 115 may transmit an indication of the first set of signal strength metrics and the second set of signal strength metrics to the base station 105. The UE 115 may communicate with the base station 105 based on the indication.

A base station 105 may receive, from a UE 115, an indication of a first set of signal strength metrics for signal strengths of transmit beams of the base station 105 using receive beams of the UE 115 and a second set of signal strength metrics for signal strengths of transmit beams of the UE 115 using receive beams of the UE 115. The base station 105 may select one or more transmit beams of the base station 105 to use for downlink communications with the UE 115 as well as one or more transmit beams of the UE 115 for the UE 115 to use for uplink communications based on the indication. The base station 105 may communicate with the UE 115 based on the selecting.

Figure 2:
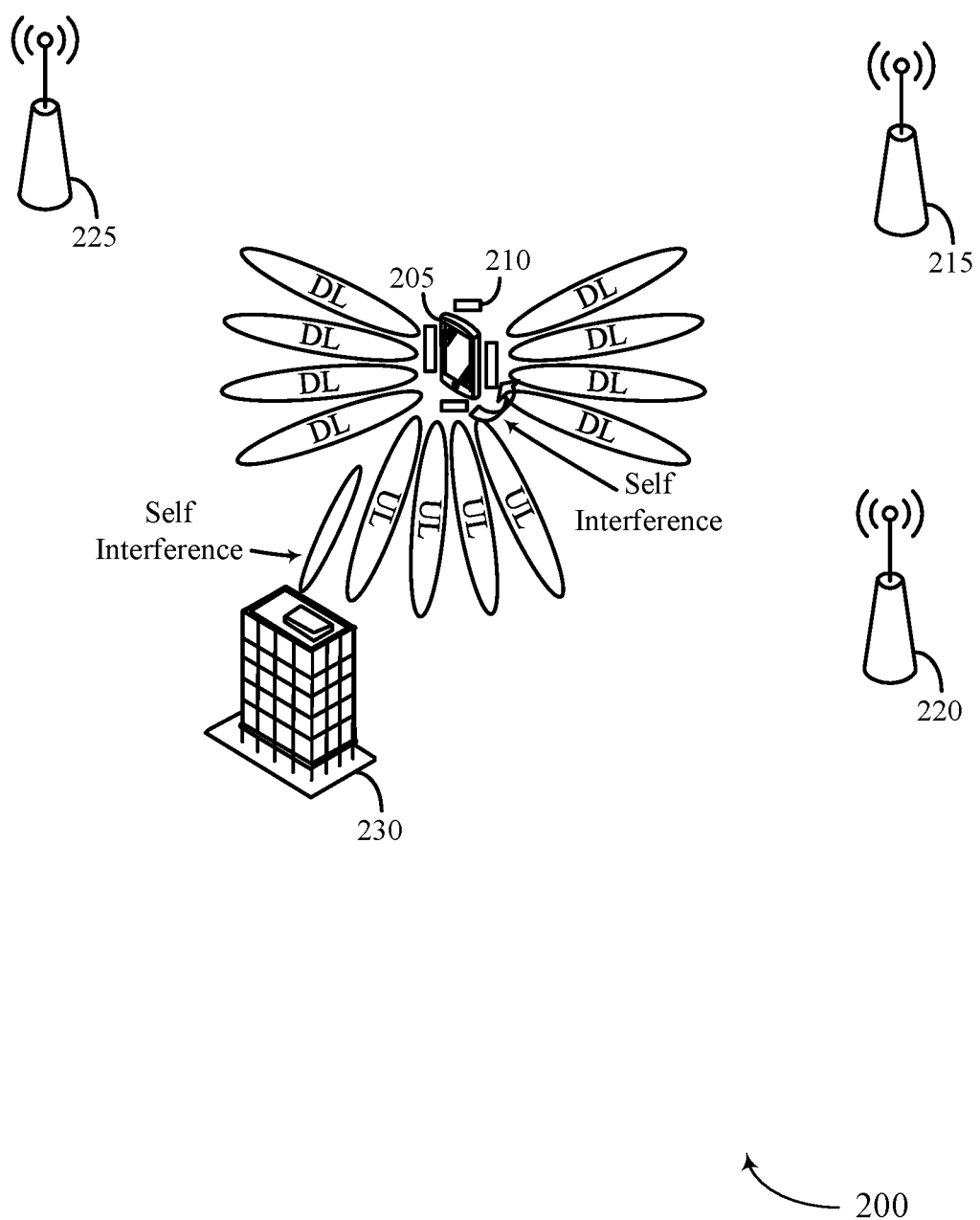
FIG. 2 illustrates an example of a wireless communication system that supports measurement reporting for full-duplex multi-beam communications in accordance with aspects of the present disclosure.

FIG. 2 illustrates an example of a wireless communication system 200 that supports measurement reporting for full-duplex multi-beam communications in accordance with aspects of the present disclosure. In some examples, wireless communication system 200 may implement aspects of wireless communication system 100. Wireless communication system 200 may include UE 205 including a set of panels 210 (with four panels 210 being shown by way of example only), base station 215, base station 220, and base station 225, which may be examples of the corresponding devices described herein. Object 230 may be located proximate to one or more devices of wireless communications system 200, which may include a building or any other structure that interferes, modifies, reflects, or otherwise impacts wireless communications between the devices.

In some aspects, UE 205 may support full-duplex communications such that UE 205 is able to transmit wireless communications using one or more transmit beams while simultaneously receiving wireless communications using one or more receive beams. Similarly, base station 215, base station 220, and/or a base station 225 may also support beamformed communications to UE 205 using different transmit beams, different receive beams, and the like (e.g., may also support full-duplex communications). For example, base station 215, base station 220, and/or base station 225 may perform a downlink transmission to UE 205 using a transmit beam of the respective base station, which UE 205 may receive using a corresponding receive beam of UE 205. Conversely, UE 205 may perform an uplink transmission to one or more of base station 215, base station 220, and/or base station 225, using a transmit beam of UE 205, which is received using a corresponding receive beam of the base station.

For full-duplex communications, UE 205 may perform an uplink transmission using a transmit beam of UE 205 while receiving a downlink transmission from any of base station 215, base station 220, and/or a base station 225 using a receive beam of UE 205. In some aspects, UE 205 may utilize one or more panels 210 to perform such beamformed communications. That is, each panel 210 may be located in a different location, orientation, etc., of UE 205. The panels 210 implemented at UE 205 may have the same or different capabilities with respect to the other panels 210. Each panel 210 may support beamformed communications using one or more transmit beams and/or receive beams of UE 205. That is, each panel 210 may include one or more antennas, antenna ports, may support a plurality of different antenna configurations, may support a plurality of different beamforming configurations, and the like. Accordingly, each panel 210 may be configured to provide or otherwise support one or more transmit beams and/or one or more receive beams of UE 205. Accordingly, UE 205 may be equipped or otherwise support a first set of transmit beams and/or receive beams using panel 0, a second set of transmit beams and/or receive beams using panel 1, and so forth, for each configured panel 210.

Generally, beam management for such communications includes UE 205 measuring reference signals transmitted by base station 215, base station 220, and/or base station 225 using their respective transmit beams. For example, UE 205 may measure the signal strength (e.g., RSRP, RSSI, etc.) and/or any other performance metric (e.g., CQI, SNR, throughput rate, etc.) for one or more transmit beams of the base station using different receive beams of UE 205. UE 205 transmits a feedback message to its serving base station (e.g., base station 215 in one non-limiting example), which uses this information to identify transmit beams of the base station and/or receive beams of UE 205 to use for beamformed communications. However, this technique may be insufficient to support beam management/optimization in some scenarios.

For example, wireless communication system 200 may support full-duplex communications between UE 205 and base station 215, base station 220, and/or base station 225. Such full-duplex communications may be implemented in the mmW range (e.g., frequency range 2 (FR2)), in the sub-THz frequency range (e.g., frequency range four (FR4), such as 140 GHz, etc.), and the like. Such full-duplex communications may double a TDD link capacity and provide very low latency. Full-duplex communications may include simultaneous transmission and reception of overlapping, non-overlapping, and/or partially overlapping FDM radio resources.

One issue to address for full-duplex communications includes strong self-interference. That is, self-interference may be associated with UE 205 transmitting while simultaneously receiving (e.g., a signal transmitted from one panel 210 may interfere with receive beams on the same panel 210 and/or on other panels 210). The self-interference may be direct (e.g., a transmission from one panel 210 interferes with receive beams on that panel 210 and/or on another panel 210) and/or indirect (e.g., a transmission from one panel 210 may reflect or bounce off of object 230, for example, with the reflected signal interfering with the same panel 210 and/or another panel 210). In some examples, base station 215, base station 220, and/or base station 225 may experience self-interference associated with full-duplex communications (e.g., between transmit beam(s) and receive beam(s) of one or more panels included in the respective base stations).

One technique to mitigate such self-interference includes using beamformed communications to provide spatial separation between the transmit beam and receive beam. That is, efficient beamforming techniques may be used to suppress self-interference to a negligible, or at least manageable, level. As the number of panels 210 increases for UE 205, the degree of spatial separation may be further improved, which further supports improved full-duplex communications. For example, an enhanced array density (e.g., more dense panels 210) may enable a more narrow beam structure and a high number of elements in a small area. Moreover, efficient implementation may enable UE 205 to measure a downlink beam's RSRP, RSSI, etc., using multiple UE receive beams simultaneously. That may result in UE 205 operating multiple receive beams simultaneously and produce an RSRP vector per UE uplink beam (e.g., per UE receive beam). However, some wireless communication systems may not provide a mechanism for the UE 205 to report its self-interference to its serving base station (e.g., base station 215 in this example), which may limit the base station's ability to optimize full-duplex multi-beam communications.

Accordingly, aspects of the described techniques provide various mechanisms for UE 205 to report its self-interference beam relations, which may be used by the base station to optimize the full-duplex multi-beam communications. Aspects of the described techniques create procedures for mmW, sub-THz, etc., frequency range communications to measure and report self-interference (e.g., RSRP, SINR, mutual interference, etc.) of multiple UE transmit beams to UE receive beams. Along with the joint quasi-colocation (QCL) reporting (e.g., the first set of signal strength metrics corresponding to the base station reference signals), these techniques may enable simultaneous multiple beam operations in full-duplex communications, forming a multi-transmission/reception point (TRP) connection.

For example, UE 205 may identify a first set of signal strength metrics for signal strengths of transmit beams of a base station using receive beams of UE 205. For example, UE 205 may measure a signal strength of a reference signal transmitted by the base station using each or a portion of a set of transmit beams of the base station. Such measuring may be on a per-receive beam of the UE basis (e.g., signal strengths of a base station transmit beam measured by multiple UE receive beams). That is, UE 205 may measure reference signals transmitted by some or all of the transmit beams of base station 215, base station 220, and/or base station 225. In some aspects, UE 205 may measure reference signals transmitted by the base stations using the subset of the transmit beams available on each base station (e.g., using transmit beams directed towards and/or near the location of UE 205). UE 205 may perform such measurement simultaneously using some or all of the receive beams of UE 205. For example, UE 205 may utilize one or more receive beams on one or more panels 210 to measure the reference signal transmissions at the same time. Accordingly, the result of the measuring may include the first set of signal strength metrics, which may include RSRP, RSSI, CQI, SNR, signal-to-noise-plus-interference (SINR), and the like, for each base station transmit beam/UE receive beam pair.

Accordingly, UE 205 may exploit the fact that the low complexity, low power mmW, sub-THz, etc., array (e.g., panel 210) can simultaneously operate many of its receive beams to sense a transmit beam (e.g., to measure the reference signal transmissions from base station 215, base station 220, and/or base station 225). Examples of the reference signal transmissions include, but are not limited to, CSI-RSs, beam management reference signals, tracking reference signals, synchronization signals, information block signals, and the like. Base station 215 may transmit or otherwise convey a configuration signal (e.g., RRC signal, MAC CE, a DCI, etc.) to UE 205 identifying resources for the reference signal transmissions. This may allow UE 205 to identify or otherwise determine spatially separated base stations (e.g., such as base station 215, base station 220, and/or base station 225). For each transmitted base station beam (e.g., for each transmit beam of the base station), UE 205 may measure an RSRP vector for multiple UE receive beams. By the last reference signal transmission using a transmit beam of the base station, UE 205 may hold and report an RSRP matrix which reflects all of the receive/transmit coupling options (e.g., a base station interference table indicating information associated with a signal strength for each base station transmit beam/UE receive beam pair). That is, as the base stations cycle through their transmit beams for reference signal transmissions, UE 205 may build a table including an RSRP vector for each transmit beam of the base station per each receive beam of UE 205. This table may form or otherwise define a first set of signal strength metrics for signal strengths of transmit beams of a base station (and/or multiple base stations) using receive beams of UE 205. Accordingly, UE 205 may generate a base station-to-UE interference table including the respective signal strength of each of the set of transmit beams of the base station for each of the set of receive beams of the UE 205.

UE 205 may also identify a second set of signal strength metrics for signal strengths of transmit beams of UE 205 using receive beams of UE 205. For example, UE 205 may measure a signal strength of a reference signal transmitted by UE 205 via each of a set of transmit beams of UE 205. The reference signals transmitted by UE 205 may be per-UE transmit beam for each panel 210. This measuring may be on a per-receive beam of UE 205 basis and the second set of signal strength metrics may be based on a result of the measuring. Base station 215, for example, may transmit or otherwise convey a configuration signal to UE 205 (e.g., RRC signaling, MAC CE, DCI, etc.) identifying resources for such reference signal transmissions. One example of the signaling may include a CSI report configuration message.

Accordingly, base station 215 (in this example) may configure full-duplex capable UE 205 with a set of radio resources (e.g., time, frequency, spatial, code, etc.) resources for self-interference measurements. The resources may support various UE transmit beams for panels 210. In some examples, UE 205 and base station 215 may negotiate/configure the number of UE transmit beams/panels 210 to be used to measure. UE 205 measures the self-interference at the designated occasions with simultaneous transmission and reception. That is, UE 205 may perform reference signal transmissions using one or more transmit beams of UE 205, while simultaneously measuring the reference signal transmissions using one or more receive beams of UE 205. This may permit UE 205 to find or otherwise identify spatially separated UE transmit and UE receive beams. For example, for each transmitted reference signal on a UE transmit beam, UE 205 may use a receive beam to measure an RSRP, SINR, RSSI, mutual interference, and the like, vector of multiple UE receive beams. By the last reference signal transmission using a UE transmit beam, UE 205 may hold and report an RSRP, RSSI, etc., matrix which reflects all of the UE transmit/receive beam pair/coupling options. Accordingly, UE 205 may generate a UE self-interference table including a respective signal strength, or information associated with the signal strength, of each of a set of transmit beams of UE 205 for each of the set of receive beams of UE 205. In some examples, each of base station 215, base station 220, and/or base station 225 may generate a base station self-interference table including a respective signal strength, or information associated with the signal strength, of each of a set of transmit beams of the base station for each of the set of receive beams of the base station based on simultaneously transmitting reference signals using the transmit beams and measuring reference signal transmissions using the receive beams.

UE 205 may transmit or otherwise convey an indication of the first set of signal strength metrics and the second set of signal strength metrics to base station 215 (for example), which may use this information to select one or more transmit beams to use for communicating with UE 205. In some aspects, this may include UE 205 transmitting the respective signal strengths (e.g., RSRP, RSSI, CQI, etc.) when transmitting or otherwise providing the indication of the first set of signal strict metrics and the second set of signal strength metrics. For example, UE 205 may simply transmit the measured signal strength values along with an indication of the transmit/receive beam coupling to base station 215.

In some examples, UE 205 may transmit an indication of whether the respective signal strength satisfies a threshold for each transmit/receive beam coupling. For example, UE 205 may measure reference signal transmissions from base station 215 when identifying the first set of signal strength metrics and from UE 205 when identifying the second set of signal strength metrics. UE 205 may compare the measured signal strengths to a threshold (e.g., a defined RSRP value, for example) to determine which measurements satisfy the threshold and which measurements do not satisfy the threshold. When transmitting the indication of the first set of signal strength metrics and the second set of signal strength metrics to base station 215, UE 205 may transmit a flag (e.g., a bit) set to one value indicating that the threshold is satisfied and/or to another value indicating that the threshold is not satisfied (e.g., fails to satisfy the threshold).

Base station 215 (in this example) may use the first set of signal strength metrics (e.g., the base station interference metrics) and the second set of signals strength metrics (e.g., the UE self-interference metrics) for link and/or beam management/optimizations. For example, base station 215 may identify which of its transmit beams and/or which of the UE 205 transmit beams may support concurrent beamformed communications, and select those transmit beams for continued communications.

Accordingly, UE 205 can report the full base station inter beam interference Tx-Rx coupling matrix and the UE self-interference Tx-Rx coupling matrix which reflects all the options (e.g., pairings). UE 205 may optionally report compressed format matrixes with one bit per entry in the table, where value 1 indicates interfere RSRP\SINR\etc. above defined threshold (e.g., satisfies a threshold). UE 205 may optionally report diluted matrixes according to reasonable assumptions such as an uplink beam cannot interfere itself. UE 205 may optionally report diluted matrixes according to reasonable assumptions such as an uplink beam cannot interfere beams in the same panel (assuming all beams in a panel are only for uplink or downlink).

These techniques may exploit the low cost high efficiency of sub-THz arrays to form full-duplex multi TRP connection. Mutual interference is minimized from the UE perspective. Using mutual interference measurement (rather than relying on self-interference characterization only) may reflect the sum of internal interference and instantaneous beams reflection from the terrain. In frequency duplexing, this may provide feedback even on symbol level and can be used for fast feedback of ACK\NACK, beam tracking, etc.

Figure 3B:
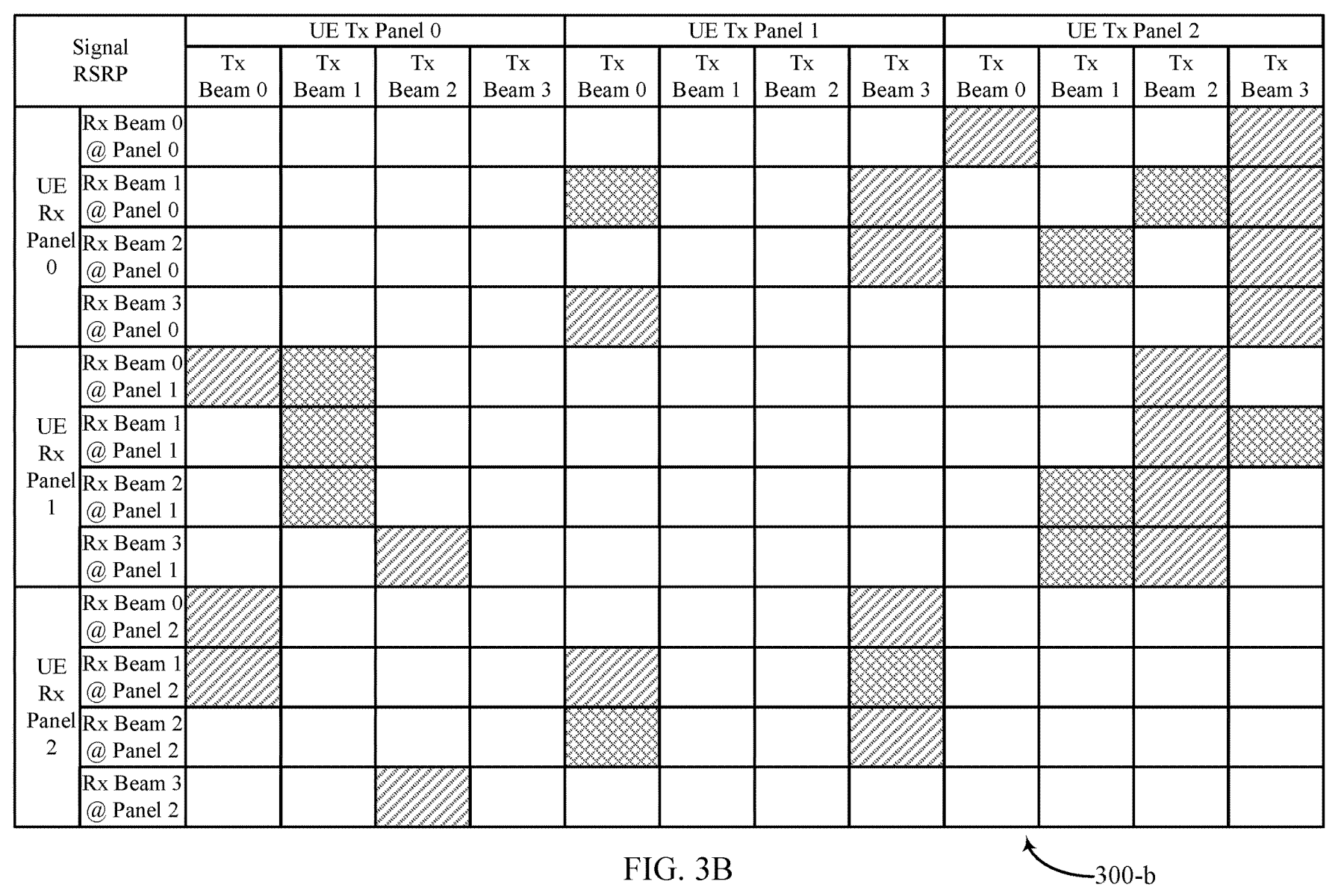

FIGS. 3A and 3B illustrate an example of a table configuration 300 that supports measurement reporting for full-duplex multi-beam communications in accordance with aspects of the present disclosure. In some examples, table configuration 300 may implement aspects of wireless communication systems 100 and/or 200. Aspects of table configuration 300 may be implemented at or implemented by a UE and/or base station, which may be examples of the corresponding devices described herein. Generally, table configuration 300-*a* of FIG. 3A illustrates an example of a base station-to-UE interference table corresponding to, or otherwise associated with, a first set of signal strength metrics. Table configuration 300-*b* of FIG. 3B illustrates an example of a UE self-interference table corresponding to, or otherwise associated with, a second set of signal strength metrics. In some cases, the techniques described herein for generating table configuration 300-*b* may be adapted and applied by a base station to generate a base station self-interference table.

As discussed above, aspects of the described techniques provide various mechanisms for a UE to report both base station interference as well as UE self-interference to its serving base station. For example, the UE may measure a signal strength of reference signals transmitted by the base station via each of a set of transmit beams of the base station. The measurement may be on a per-receive beam of the UE basis (e.g., the UE may identify a signal strength of reference signals transmitted on each base station transmit beam and received at each UE receive beam). Based on the results of the measurement, the UE may identify a first set of signal strength metrics for the signal strengths of the transmit beams of the base station using the receive beams of the UE. The UE also may measure a signal strength of reference signals transmitted by the UE via each of a set of transmit beams of the UE. The measurement may be on a per-receive beam of the UE basis (e.g., the UE may identify a signal strength of reference signals transmitted on each UE transmit beam and received at each UE receive beam). Based on the results of the measurement, the UE may identify a second set of signal strength metrics for the signal strengths of the transmit beams of the UE using the receive beams of the UE. The UE may transmit or otherwise convey an indication of the first set of signal strength metrics and the second set of signal strength metrics to the base station.

Broadly, table configuration 300-a of FIG. 3A illustrates an example of the first set of signal strength metrics and table configuration 300-b of FIG. 3B illustrates an example of the second set of signal strength metrics indicated to the base station. In some examples, the indication may include the actual signal strength for each transmit beam/receive beam pair. For example, each intersecting row/column may indicate the RSRP value, RSSI, etc., for the corresponding transmit beam (e.g., base station (BS) transmit beam and/or UE transmit beam) and receive beam (e.g., UE receive beam 0 on panel 1, UE receive beam 1 on panel 2, etc.) pair. In some aspects, each indicated signal strength may also be conveyed in a manner such that the transmit/receive beam pair is identified. In one example, the base station and UE may each know the other's capabilities such that a sequence of signal strengths may be understood to correspond to begin at row 1, column 1 (e.g., may correspond to BS transmit beam 0, UE receive beam 0 on panel 0), and subsequent signal strengths may be mapped in a left-to-right, top-to-bottom manner, or some other known mapping order.

In another example, each indicated signal strength may be accompanied by an indicator of the transmit/receive beam pair. For example, the UE may convey explicit information identifying the signal strength and transmit/receive beam pair. Accordingly, the information associated with a base station-to-UE interference table and the UE self-interference table may be the respective signal strengths.

In another example, the UE may transmit the indication of the first set of signal strength metrics and the second set of signal strength message using a bit, a field, flag, etc., that indicates that the corresponding transmit/receive beam pair satisfies or fails to satisfy a threshold. For example, the threshold may be negotiated/configured between the UE and base station, such as a threshold RSRP level, interference level, a throughput rate, etc. The UE may perform the measurements to identify the first set of signal strength metrics and the second set of signal strength metrics and compare the corresponding signal strengths to the threshold. In transmitting the indication of the first set of signal strength metrics and the second set of signal strength metrics, the UE may configure or otherwise convey an indication of transmit/receive beam pairs the satisfy the threshold (e.g., the measured signal strength satisfies the RSRP threshold) or fails to satisfy the threshold.

As also discussed above, the base station may use the combined information conveyed in the first set of signal strength metrics and the second set of signal strength metrics for link and/or beam management/optimization. That is, the base station may utilize the first set of signal strength metrics to identify the performance for each BS transmit beam/UE receive beam pair as well as the second set of signal strength metrics to identify the performance of each UE transmit beam/UE receive beam pair. Previously, the base station would only have the base station-to-UE interference information corresponding to table configuration 300-a when performing such link and/or beam management for/optimization. However, the described techniques enable the base station to also consider the UE self-interference as indicated in the second set of signal strength metrics.

As one example, the first and/or second sets of signal strength metrics may indicate that the UE performing uplink transmissions using UE transmit beams 2 and 3 on panel 2 (as illustrated by forward cross hatching in table configuration 300-b) may cause strong interference for UE receive beams 0-3 on panels 0 and 1. That is, {Panel,TxBeam}={2, 2} interferes with {Panel,RxBeam}={1,0:3} and {Panel, TxBeam}={2,3} interferes with {Panel,RxBeam}={0,0:3}. Accordingly, the base station and/or UE may avoid scheduling or otherwise configuring uplink transmissions from the UE on UE panel 2.

As another example, the first and/or second sets of signal strength metrics may indicate that the UE performing uplink transmissions using UE transmit beams on panel 0 (as illustrated by forward cross hatching in table configuration 300-b) may not cause interference with any base station transmit beams on other panels. That is, {Panel,TxBeam}={0,0}, {0,1}, {0,3} of the UE may not interfere with any downlink beams of the base station. Accordingly, the base station and/or UE may schedule uplink transmissions using UE transmit beams on panel 0.

As another example, the first and/or second sets of signal strength metrics may indicate that the uplink from transmissions from the UE on {Panel,TxBeam}={0,2} interfere with both base station transmit beams 0 and 7 and UE transmit beams {Panel,TxBeam}={1,2}, {2,3}. Accordingly, the base station and/or UE may avoid scheduling uplink transmissions using UE transmit beam 2 on panel 0.

Although the described techniques generally refer to a base station and UE performing link and/or beam management/optimization, it is to be understood that the base station may receive similar information from other UEs (e.g., from a second UE) and use this information in addition to the first set of signal strength metrics and the second set of signal strength metrics for more comprehensive link and/or beam management/optimization. For example, the base station may receive, from a second UE, an indication of a third set of signal strength metrics for signal strengths of transmit beams of the base station using receive beams of the second UE and a fourth set of signal strength metrics for signal strengths of transmit beams of the second UE using receive beams of the second UE. That is, the second UE (and third UE, and fourth UE, and so on) may identify its own base station-to-UE interference table and UE self-interference tables and provide this information to the base station. The base station may collect such information from multiple UEs, and use the interference information when selecting beams (e.g., base station transmit beams, UE receive beams, UE transmit beams, or any combination thereof) for communications with each UE.

Figure 4:
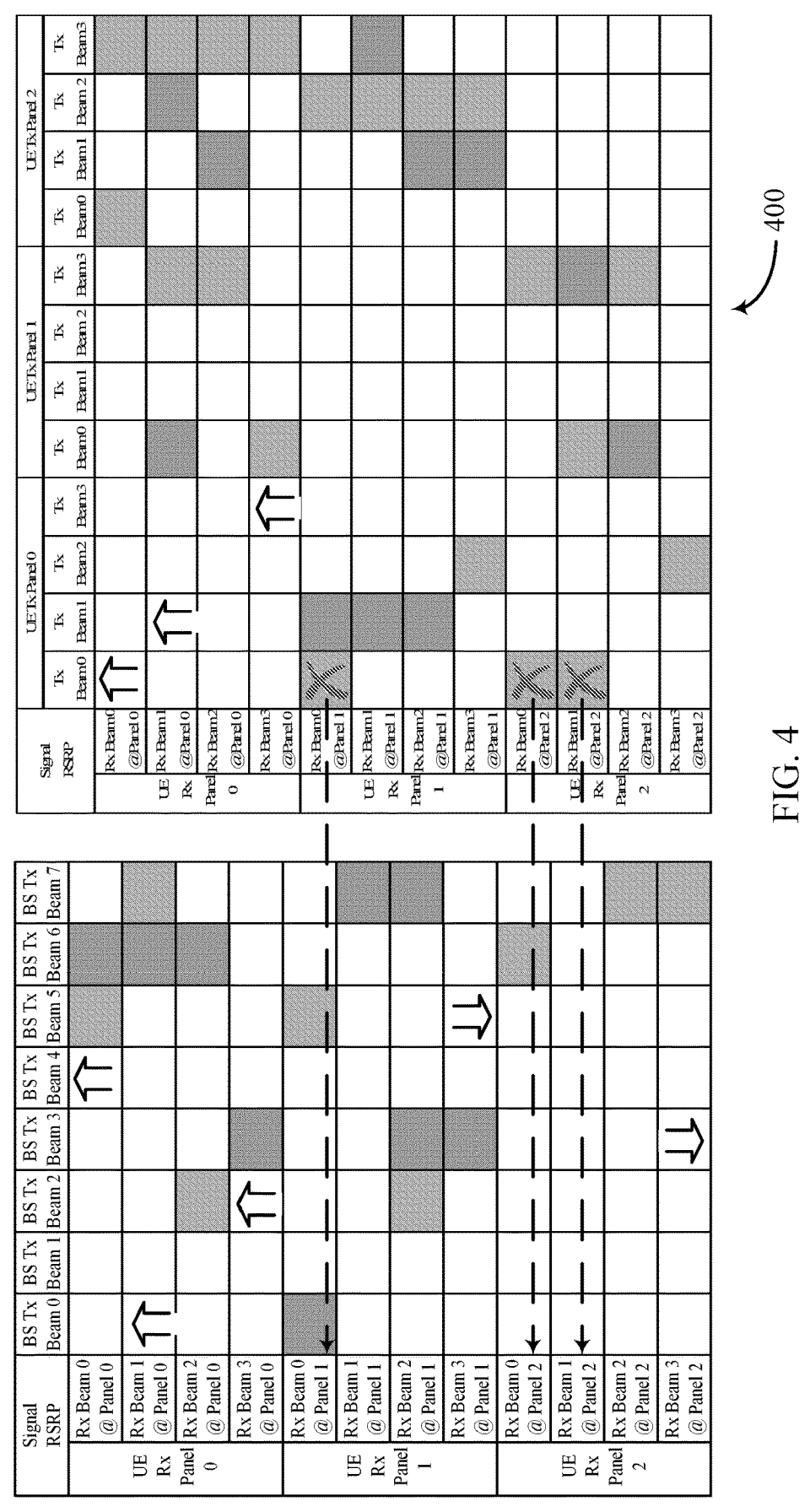

FIG. 4 illustrates an example of a table configuration 400 that supports measurement reporting for full-duplex multi-beam communications in accordance with aspects of the present disclosure. In some examples, table configuration 400 may implement aspects of wireless communication systems 100 and/or 200 and/or table configuration 300. Aspects of table configuration 400 may be implemented at or implemented by a UE and/or base station, which may be examples of the corresponding devices described herein. Generally, table configuration 400 illustrates an example of how the table configuration 300-a of FIG. 3A and the table configuration 300-b of FIG. 3B may be used to select beam(s) for link and/or beam management/optimization.

As discussed above, aspects of the described techniques provide various mechanisms for a UE to report both base station interference as well as UE self-interference to its serving base station. For example, the UE may measure a signal strength of reference signals transmitted by the base station via each of a set of transmit beams of the base station. The measurement may be on a per-receive beam of the UE basis (e.g., the UE may identify a signal strength of reference signals transmitted on each base station transmit beam and received at each UE receive beam). Based on the results of the measurement, the UE may identify a first set of signal strength metrics for the signal strengths of the transmit beams of the base station using the receive beams of the UE. The UE also may measure a signal strength of reference signals transmitted by the UE via each of a set of transmit beams of the UE. The measurement may be on a per-receive beam of the UE basis (e.g., the UE may identify a signal strength of reference signals transmitted on each UE transmit beam and received at each UE receive beam). Based on the results of the measurement, the UE may identify a second set of signal strength metrics for the signal strengths of the transmit beams of the UE using the receive beams of the UE. The UE may transmit or otherwise convey an indication of the first set of signal strength metrics and the second set of signal strength metrics to the base station.

Broadly, table configuration 400 illustrates an example of optimizing a link using the base station-to-UE interference and UE self-interference matrix/tables illustrated in table configuration 300. In particular, table configuration identifies and cross-correlates uplink markers (↑), downlink markers (↓), and interference (χ), between the first set of signal strength metrics and second set of signal strength metrics. As discussed above, in some examples the indication may include the actual signal strength for each transmit beam/receive beam pair and/or may use a bit, a field, flag, etc., that indicates that the corresponding transmit/receive beam pair satisfies or fails to satisfy a threshold.

The base station may use the combined information conveyed in the first set of signal strength metrics and the second set of signal strength metrics for link and/or beam management/optimization. That is, the base station may utilize the first set of signal strength metrics to identify the performance for each BS transmit beam/UE receive beam pair as well as the second set of signal strength metrics to identify the performance of each UE transmit beam/UE receive beam pair. In the example illustrated in table configuration 400, this may indicate that UE performing uplink transmissions using UE {Panel,TxBeam}={0,0}, {0,1}, {0,3} interferes with base station transmit beams 0, 2, and 4. Accordingly, base station transmit beams 0, 2, and 4 may be avoided when scheduling downlink transmissions to the UE and/or other UEs. This may also indicate that base station transmit beams 3 and 5 may be utilized without any corresponding or unacceptable interference being introduced into the UE self-interference table. Accordingly, downlink transmissions from the base station using transmit beams 3 and 5 may be identified as supported for beamformed communications. This may also indicate that the UE performing uplink transmissions using UE transmit beam 0 on UE panel 0 introduce unacceptable UE interference and/or base station interference. Accordingly, the base station and/or UE may avoid such transmissions to mitigate interference.

Accordingly, the base station may consider the uplink marker, downlink marker, and/or interference marker when performing link and/or beam management/optimization. For example, the base station may select specific base station transmit beam(s), UE transmit beam(s), and/or UE receive beams (e.g., on a per-panel basis) to use for communications with the UE.

Figure 5:
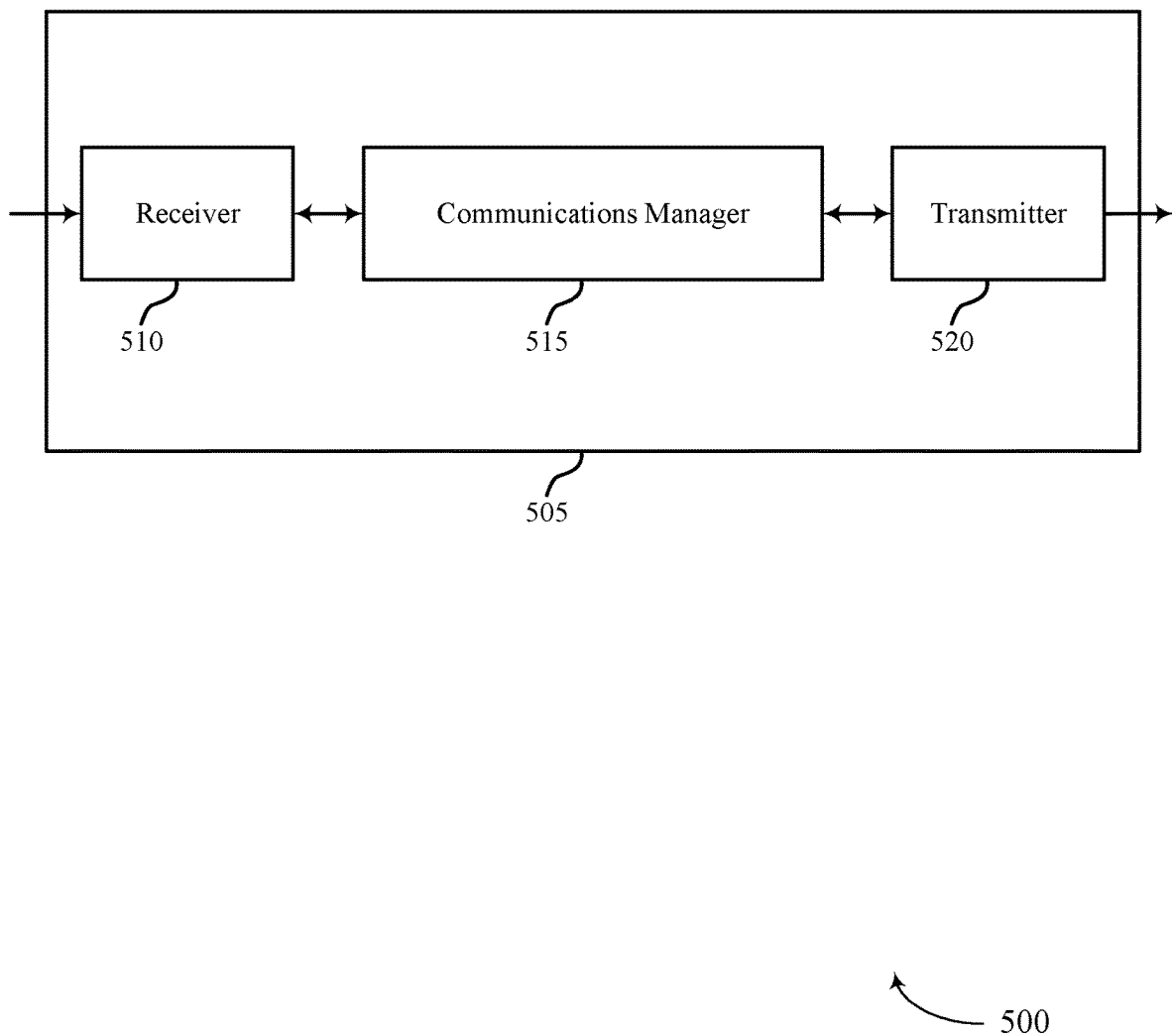
FIGS. 5 and 6 show diagrams of devices that support measurement reporting for full-duplex multi-beam communications in accordance with aspects of the present disclosure.

FIG. 5 shows a diagram 500 of a device 505 that supports measurement reporting for full-duplex multi-beam communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to measurement reporting for full-duplex multi-beam communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a first set of signal strength metrics for signal strengths of transmit beams of a base station using receive beams of the UE, identify a second set of signal strength metrics for signal strengths of transmit beams of the UE using receive beams of the UE, transmit an indication of the first set of signal strength metrics and the second set of signal strength metrics to the base station, and communicate with the base station based on the indication. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

By including or configuring the communications manager 515 in accordance with examples as described herein, the device 505 (e.g., a processor controlling or otherwise coupled to the receiver 510, the communications manager 515, the transmitter 520, or a combination thereof) may support techniques for reduced processing, reduced power consumption, and more efficient utilization of communication resources by supporting beam management/optimization determinations.

Figure 6:
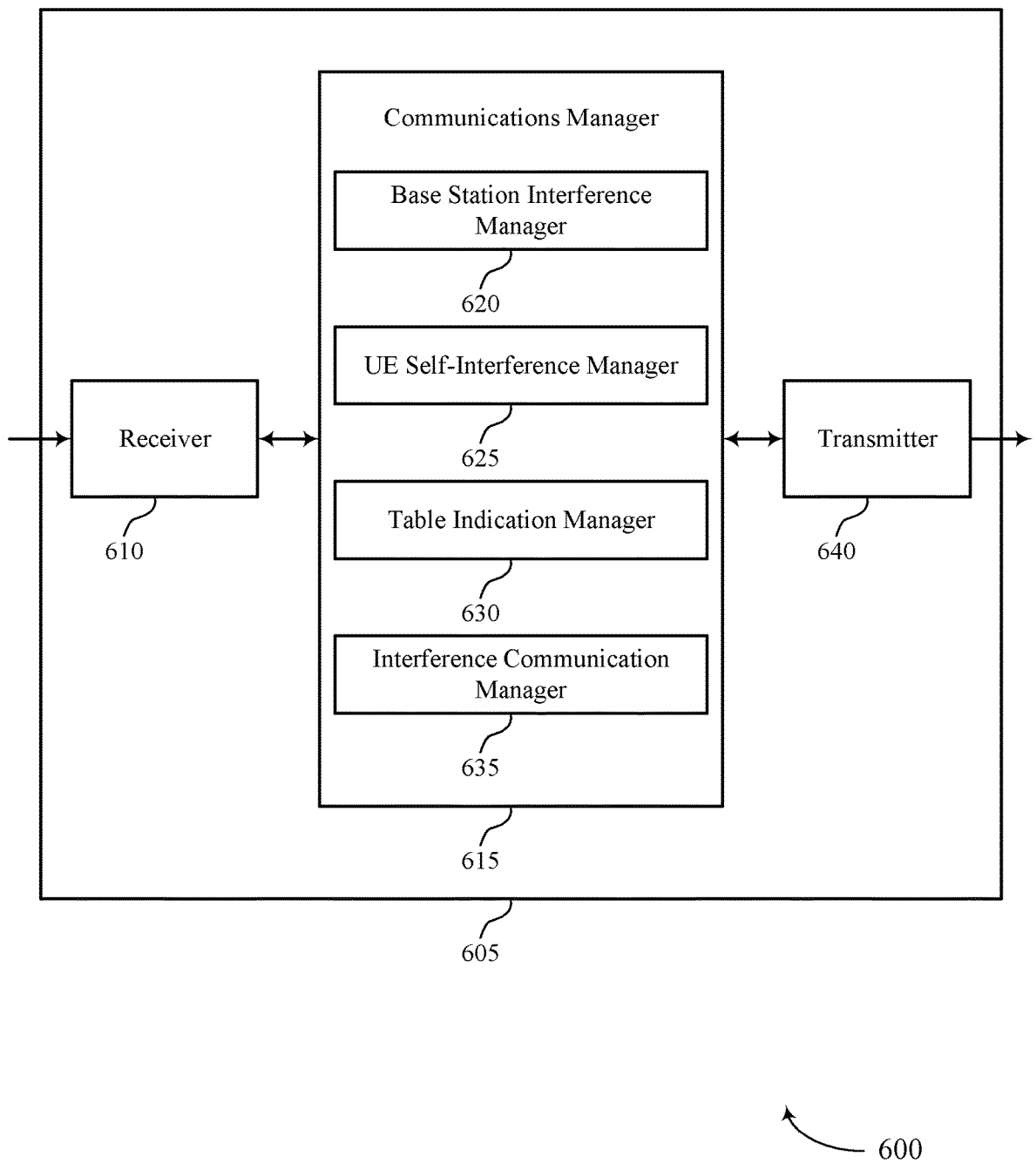

FIG. 6 shows a diagram 600 of a device 605 that supports measurement reporting for full-duplex multi-beam communications in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to measurement reporting for full-duplex multi-beam communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a base station interference manager 620, a UE self-interference manager 625, a table indication manager 630, and an interference communication manager 635. The communications manager 615 may be an example of aspects of the communications manager 810 described herein.

The base station interference manager 620 may identify a first set of signal strength metrics for signal strengths of transmit beams of a base station using receive beams of the UE.

The UE self-interference manager 625 may identify a second set of signal strength metrics for signal strengths of transmit beams of the UE using receive beams of the UE.

The table indication manager 630 may transmit an indication of the first set of signal strength metrics and the second set of signal strength metrics to the base station.

The interference communication manager 635 may communicate with the base station based on the indication.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
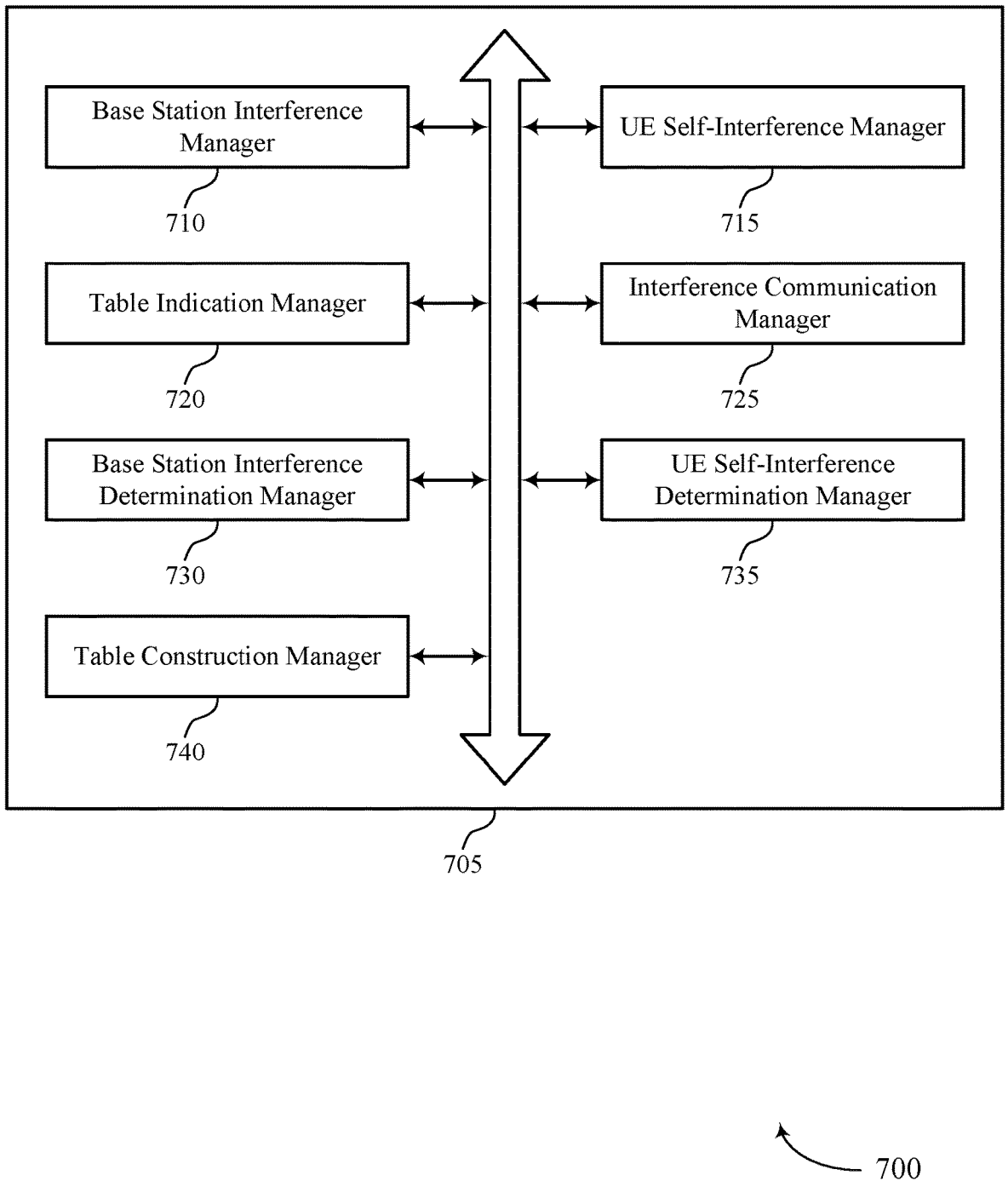
FIG. 7 shows a diagram of a communications manager that supports measurement reporting for full-duplex multi-beam communications in accordance with aspects of the present disclosure.

FIG. 7 shows a diagram 700 of a communications manager 705 that supports measurement reporting for full-duplex multi-beam communications in accordance with aspects of the present disclosure. The communications manager 705 may be an example of aspects of a communications manager 515, a communications manager 615, or a communications manager 810 described herein. The communications manager 705 may include a base station interference manager 710, a UE self-interference manager 715, a table indication manager 720, an interference communication manager 725, a base station interference determination manager 730, a UE self-interference determination manager 735, and a table construction manager 740. Each of these modules may communicate, directly or indirectly, with one another (e.g., via one or more buses).

The base station interference manager 710 may identify a first set of signal strength metrics for signal strengths of transmit beams of a base station using receive beams of the UE.

The UE self-interference manager 715 may identify a second set of signal strength metrics for signal strengths of transmit beams of the UE using receive beams of the UE.

The table indication manager 720 may transmit an indication of the first set of signal strength metrics and the second set of signal strength metrics to the base station.

The interference communication manager 725 may communicate with the base station based on the indication.

The base station interference determination manager 730 may measure a signal strength of a reference signal transmitted by the base station via a set of transmit beams of the base station, where the measuring is on a per-receive beam of the UE basis and the first set of signal strength metrics include a result of the measuring. In some examples, the base station interference determination manager 730 may receive, from the base station, a configuration signal identifying reference signal resources for the reference signal transmissions by the base station.

The UE self-interference determination manager 735 may measure a signal strength of a reference signal transmitted by the UE via a set of transmit beams of the UE, where the measuring is on a per-receive beam of the UE basis and the second set of signal strength metrics include a result of the measuring. In some examples, the UE self-interference determination manager 735 may receive, from the base station, a configuration signal identifying resources for the reference signal transmissions by the UE.

The table construction manager 740 may generate a base station-to-UE interference table including a respective signal strength of a set of transmit beams of the base station for a set of receive beams of the UE. In some examples, generating a UE self-interference table including a respective signal strength of a set of transmit beams of the UE for the set of receive beams of the UE, where the indication of the first set of signal strength metrics includes information associated with the base station-to-UE interference table and the UE self-interference table. In some cases, the information associated with the base station-to-UE interference table and the UE self-interference table includes the respective signal strengths.

In some cases, the information associated with the base station-to-UE interference table and the UE self-interference table includes a respective indication, for each base station transmit beam-to-UE receive beam combination of the base station-to-UE interference table, for each UE transmit beam-to-UE receive beam combination of the UE self-interference table, or both, of whether the respective signal strength satisfies a threshold. In some cases, the information associated with the base station-to-UE interference table and the UE self-interference table includes a respective indication for any base station transmit beam-to-UE receive beam combination of the base station-to-UE interference table, for any UE transmit beam-to-UE receive beam combination of the UE self-interference table, or both, associated with a signal strength that fails to satisfy a threshold.

Figure 8:
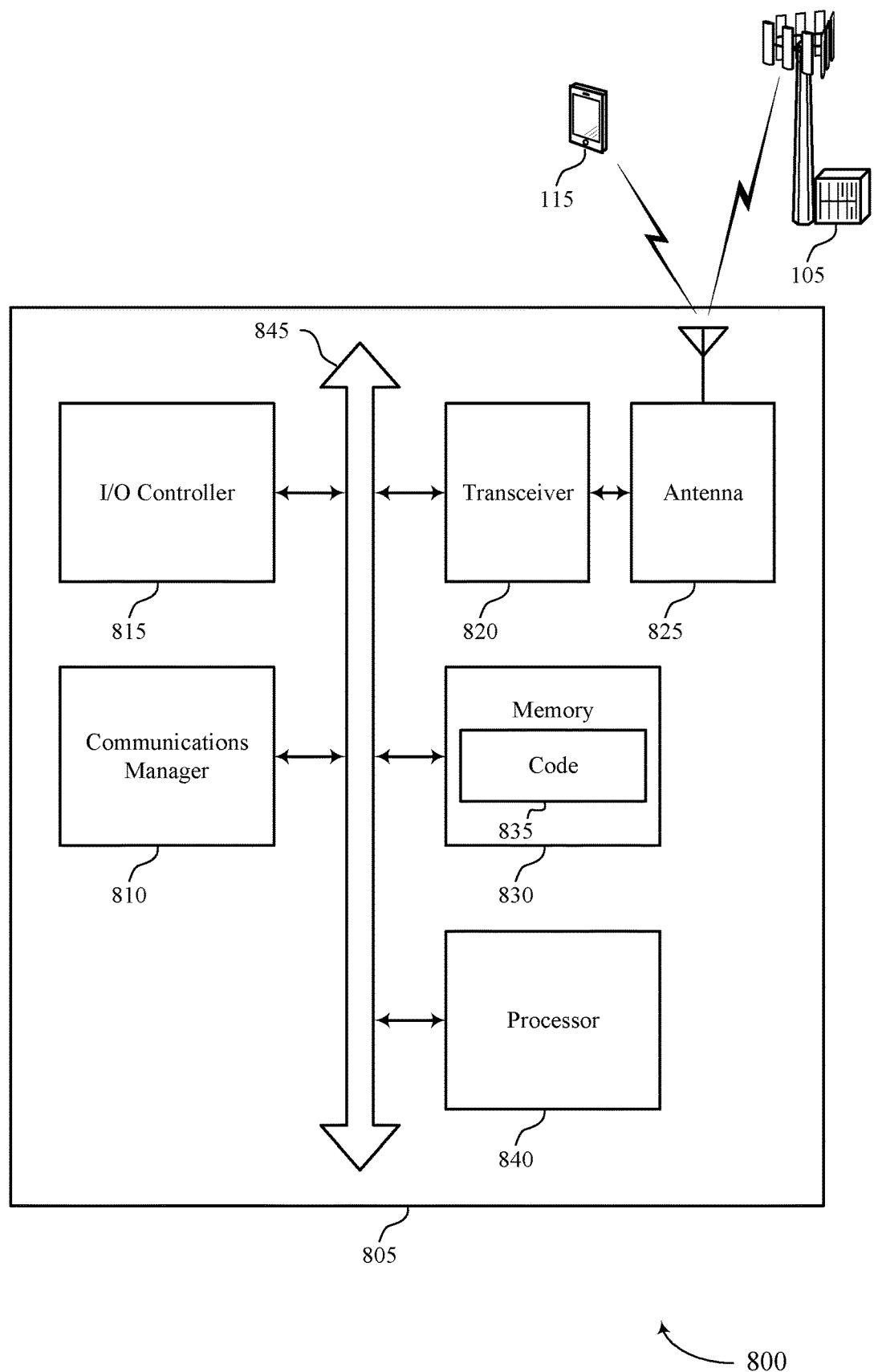
FIG. 8 shows a diagram of a system including a device that supports measurement reporting for full-duplex multi-beam communications in accordance with aspects of the present disclosure.

FIG. 8 shows a diagram of a system 800 including a device 805 that supports measurement reporting for full-duplex multi-beam communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a first set of signal strength metrics for signal strengths of transmit beams of a base station using receive beams of the UE, identify a second set of signal strength metrics for signal strengths of transmit beams of the UE using receive beams of the UE, transmit an indication of the first set of signal strength metrics and the second set of signal strength metrics to the base station, and communicate with the base station based on the indication.

By including or configuring the communications manager 810 in accordance with examples as described herein, the device 805 may support techniques for improved data rates, spectral efficiency, reliability, resource usage, battery life, processing capability, coordination between devices, latency, and power consumption, among other benefits, by supporting, for example, beam management/optimization determinations.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting measurement reporting for full-duplex multi-beam communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
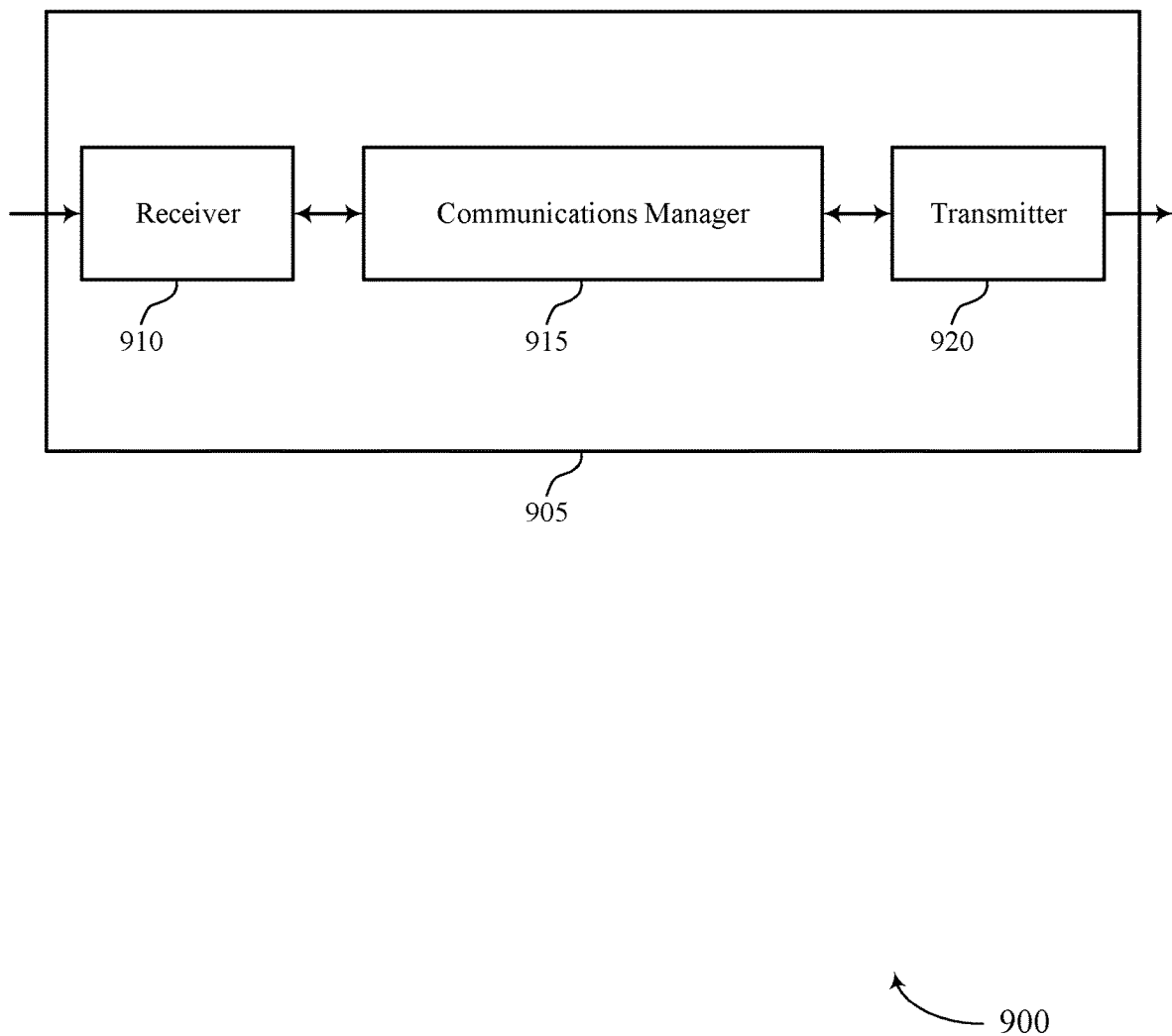
FIGS. 9 and 10 show diagrams of devices that support measurement reporting for full-duplex multi-beam communications in accordance with aspects of the present disclosure.

FIG. 9 shows a diagram 900 of a device 905 that supports measurement reporting for full-duplex multi-beam communications in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to measurement reporting for full-duplex multi-beam communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, an indication of a first set of signal strength metrics for signal strengths of transmit beams of the base station using receive beams of the UE and a second set of signal strength metrics for signal strengths of transmit beams of the UE using receive beams of the UE, select one or more transmit beams of the base station to use for communicating with the UE based on the indication, and communicate with the UE based on the selecting. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

By including or configuring the communications manager 915 in accordance with examples as described herein, the device 905 (e.g., a processor controlling or otherwise coupled to the receiver 910, the communications manager 915, the transmitter 920, or a combination thereof) may support techniques for reduced processing, reduced power consumption, and more efficient utilization of communication resources by supporting beam management/optimization determinations.

Figure 10:
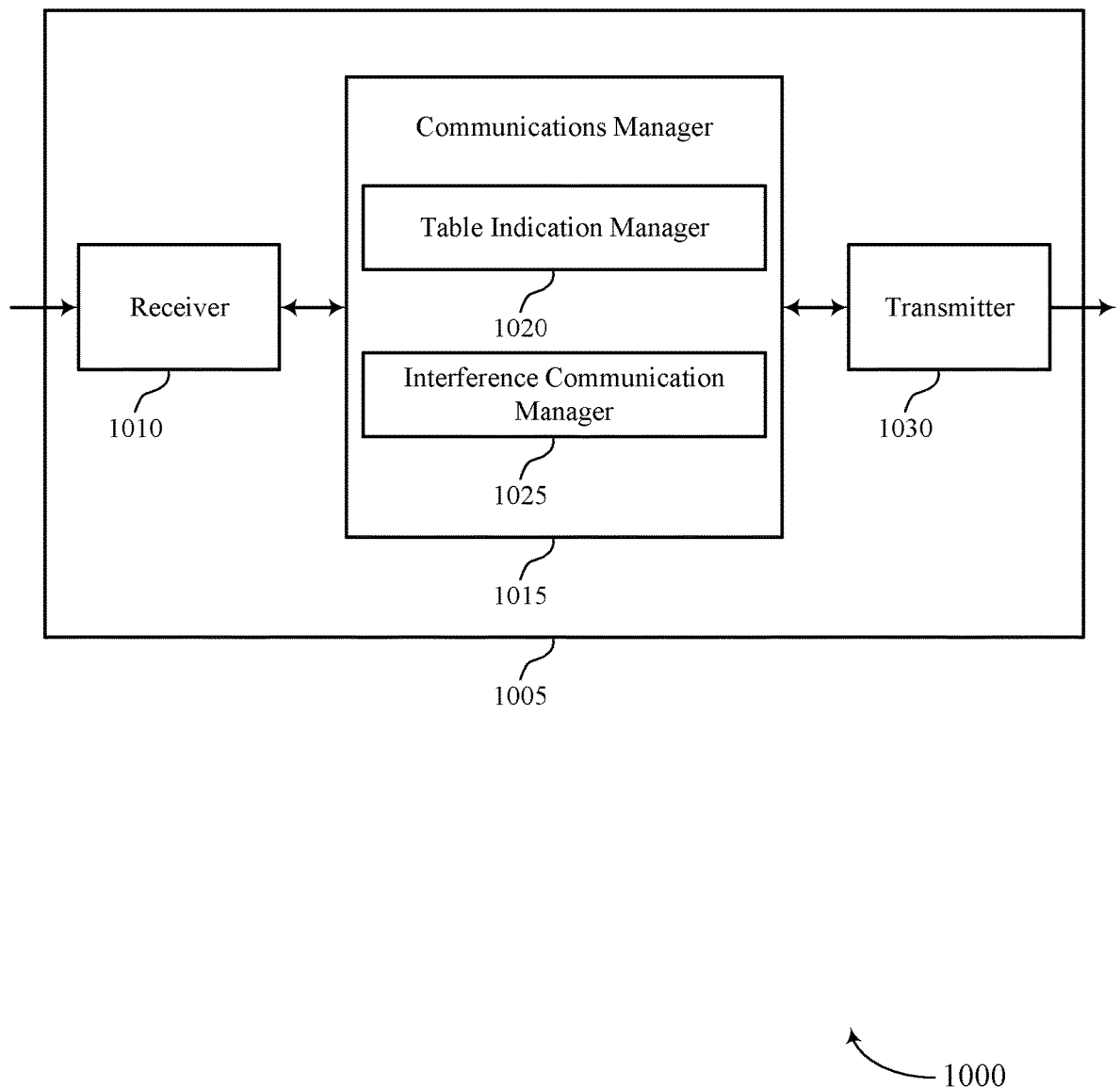

FIG. 10 shows a diagram 1000 of a device 1005 that supports measurement reporting for full-duplex multi-beam communications in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to measurement reporting for full-duplex multi-beam communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a table indication manager 1020 and an interference communication manager 1025. The communications manager 1015 may be an example of aspects of the communications manager 1210 described herein.

The table indication manager 1020 may receive, from a UE, an indication of a first set of signal strength metrics for signal strengths of transmit beams of the base station using receive beams of the UE and a second set of signal strength metrics for signal strengths of transmit beams of the UE using receive beams of the UE.

The interference communication manager 1025 may select one or more transmit beams of the base station to use for communicating with the UE based on the indication and communicate with the UE based on the selecting.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
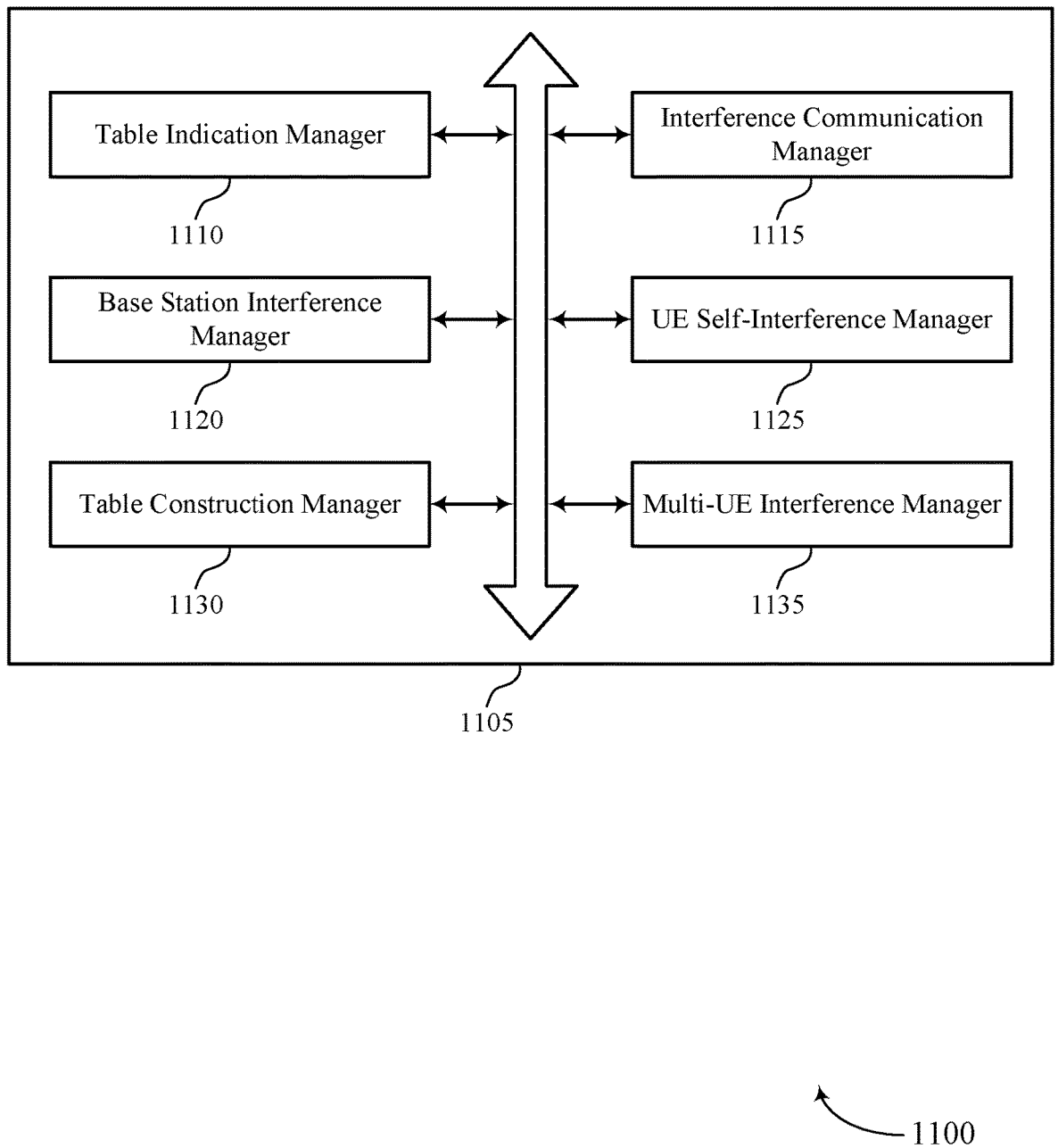
FIG. 11 shows a diagram of a communications manager that supports measurement reporting for full-duplex multi-beam communications in accordance with aspects of the present disclosure.

FIG. 11 shows a diagram 1100 of a communications manager 1105 that supports measurement reporting for full-duplex multi-beam communications in accordance with aspects of the present disclosure. The communications manager 1105 may be an example of aspects of a communications manager 915, a communications manager 1015, or a communications manager 1210 described herein. The communications manager 1105 may include a table indication manager 1110, an interference communication manager 1115, a base station interference manager 1120, a UE self-interference manager 1125, a table construction manager 1130, and a multi-UE interference manager 1135. Each of these modules may communicate, directly or indirectly, with one another (e.g., via one or more buses).

The table indication manager 1110 may receive, from a UE, an indication of a first set of signal strength metrics for signal strengths of transmit beams of the base station using receive beams of the UE and a second set of signal strength metrics for signal strengths of transmit beams of the UE using receive beams of the UE.

The interference communication manager 1115 may select one or more transmit beams of the base station to use for communicating with the UE based on the indication. In some examples, the interference communication manager 1115 may communicate with the UE based on the selecting.

The base station interference manager 1120 may determine, based on the first set of signal strength metrics, a signal strength of a reference signal transmitted by the base station using a set of transmit beams of the base station, where the signal strength is on a per-receive beam of the UE basis. In some examples, the base station interference manager 1120 may transmit a configuration signal identifying reference signal resources for the reference signal transmissions by the base station.

The UE self-interference manager 1125 may determine, based on the second set of signal strength metrics, a signal strength of a reference signal transmitted by the UE using a set of transmit beams of the UE, where the signal strength is on a per-receive beam of the UE basis. In some examples, the UE self-interference manager 1125 may transmit, to the UE, a configuration signal identifying resources for the reference signal transmissions by the UE.

The table construction manager 1130 may generate, based on the first set of signal strength metrics, a base station-to-UE interference table including a respective signal strength of a set of transmit beams of the base station for a set of receive beams of the UE. In some examples, the table construction manager 1130 may generate, based on the second set of signal strength metrics, a UE self-interference table including a respective signal strength of a set of transmit beams of the UE for the set of receive beams of the UE. In some cases, the indication includes the respective signal strengths associated with the base station-to-UE interference table and the UE self-interference table.

In some cases, the indication includes a respective indication of whether a signal strength associated with each base station transmit beam-to-UE receive beam combination of the combination of the base station-to-UE interference table, each UE transmit beam-to-UE receive beam combination of the UE self-interference table, or both, satisfies a threshold. In some cases, the indication includes a respective indication for any base station transmit beam-to-UE receive beam combination of the combination of the base station-to-UE interference table, for any UE transmit beam-to-UE receive beam combination of the UE self-interference table, or both, associated with a signal strength that fails to satisfy a threshold.

The multi-UE interference manager 1135 may receive, from a second UE, an indication of a third set of signal strength metrics for signal strengths of transmit beams of the base station using receive beams of the second UE and a fourth set of signal strength metrics for signal strengths of transmit beams of the second UE using receive beams of the second UE, where selecting the one or more transmit beams of the base station to use for communicating with the UE is based on the third set of signal strength metrics, the fourth set of signal strength metrics, or both.

Figure 12:
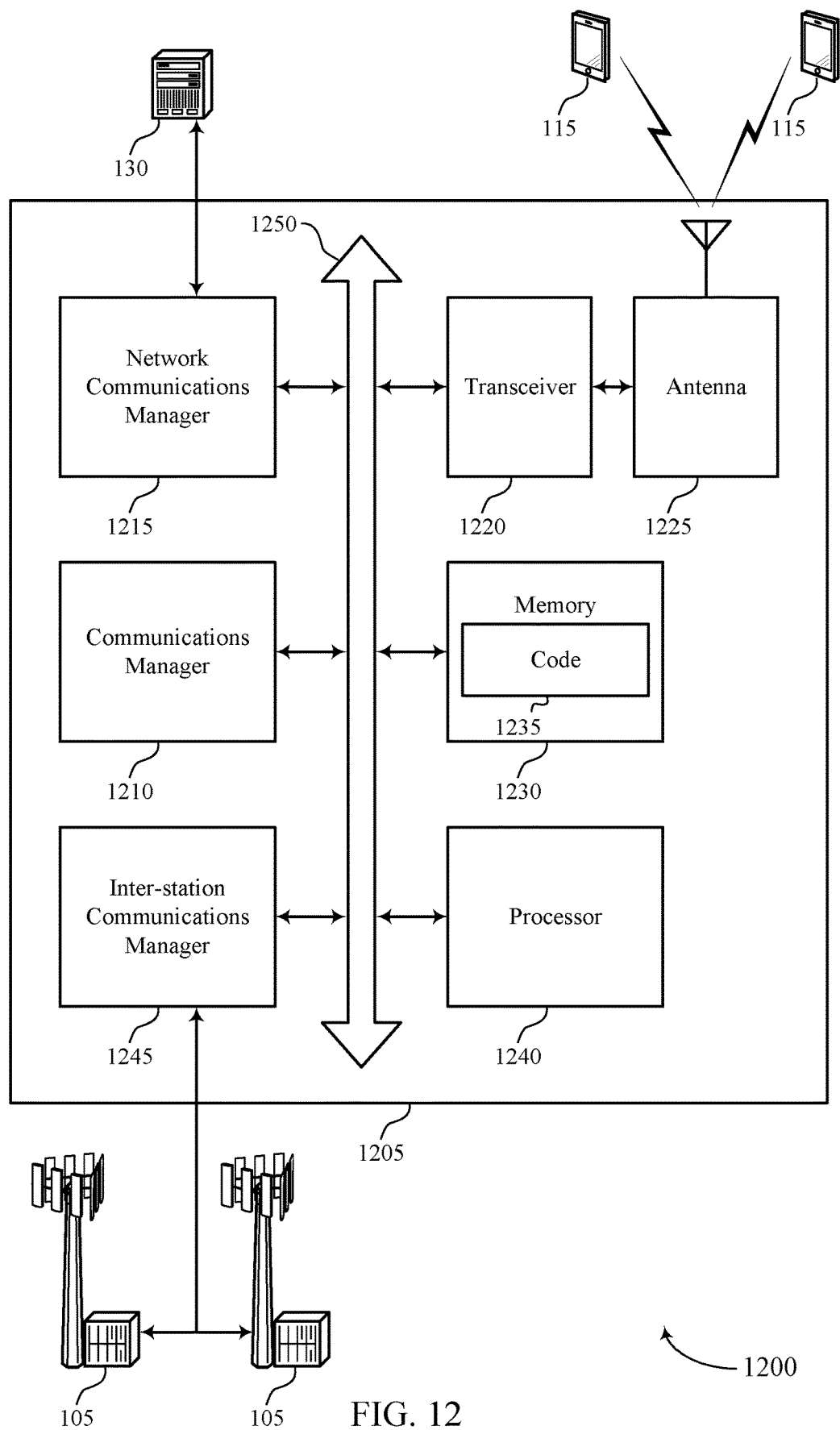
FIG. 12 shows a diagram of a system including a device that supports measurement reporting for full-duplex multi-beam communications in accordance with aspects of the present disclosure.

FIG. 12 shows a diagram of a system 1200 including a device 1205 that supports measurement reporting for full-duplex multi-beam communications in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, an indication of a first set of signal strength metrics for signal strengths of transmit beams of the base station using receive beams of the UE and a second set of signal strength metrics for signal strengths of transmit beams of the UE using receive beams of the UE, select one or more transmit beams of the base station to use for communicating with the UE based on the indication, and communicate with the UE based on the selecting.

By including or configuring the communications manager 1210 in accordance with examples as described herein, the device 1205 may support techniques for improved data rates, spectral efficiency, reliability, resource usage, battery life, processing capability, coordination between devices, latency, and power consumption, among other benefits, by supporting, for example, beam management/optimization determinations.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting measurement reporting for full-duplex multi-beam communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
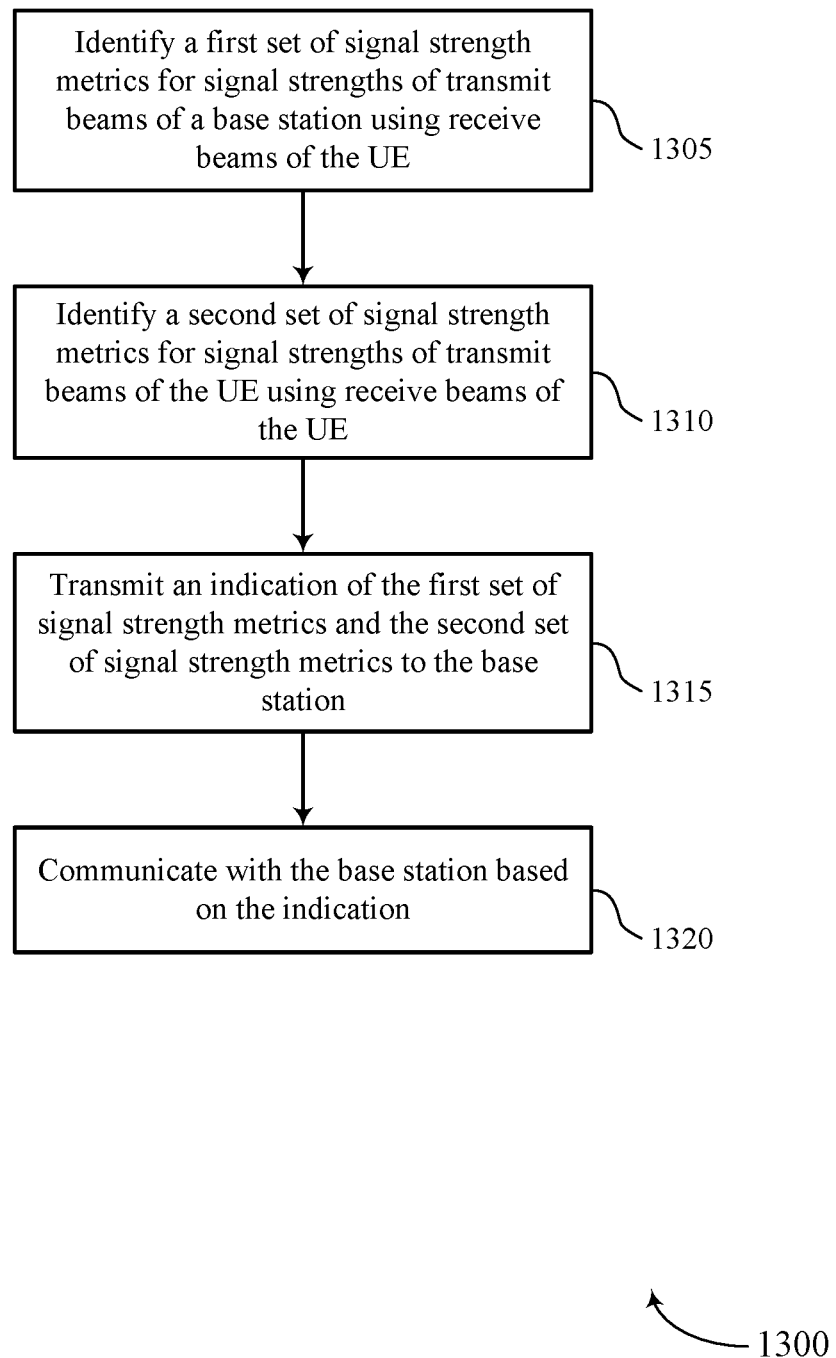
FIGS. 13 through 17 show flowcharts illustrating methods that support measurement reporting for full-duplex multi-beam communications in accordance with aspects of the present disclosure.

FIG. 13 shows a flowchart illustrating a method 1300 that supports measurement reporting for full-duplex multi-beam communications in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a first set of signal strength metrics for signal strengths of transmit beams of a base station using receive beams of the UE. The operations of 1305 may be performed according to the methods described herein. In some examples, aspects of the operations of 1305 may be performed by a base station interference manager as described with reference to FIGS. 5 through 8.

At 1310, the UE may identify a second set of signal strength metrics for signal strengths of transmit beams of the UE using receive beams of the UE. The operations of 1310 may be performed according to the methods described herein. In some examples, aspects of the operations of 1310 may be performed by a UE self-interference manager as described with reference to FIGS. 5 through 8.

At 1315, the UE may transmit an indication of the first set of signal strength metrics and the second set of signal strength metrics to the base station. The operations of 1315 may be performed according to the methods described herein. In some examples, aspects of the operations of 1315 may be performed by a table indication manager as described with reference to FIGS. 5 through 8.

At 1320, the UE may communicate with the base station based on the indication. The operations of 1320 may be performed according to the methods described herein. In some examples, aspects of the operations of 1320 may be performed by an interference communication manager as described with reference to FIGS. 5 through 8.

Figure 14:
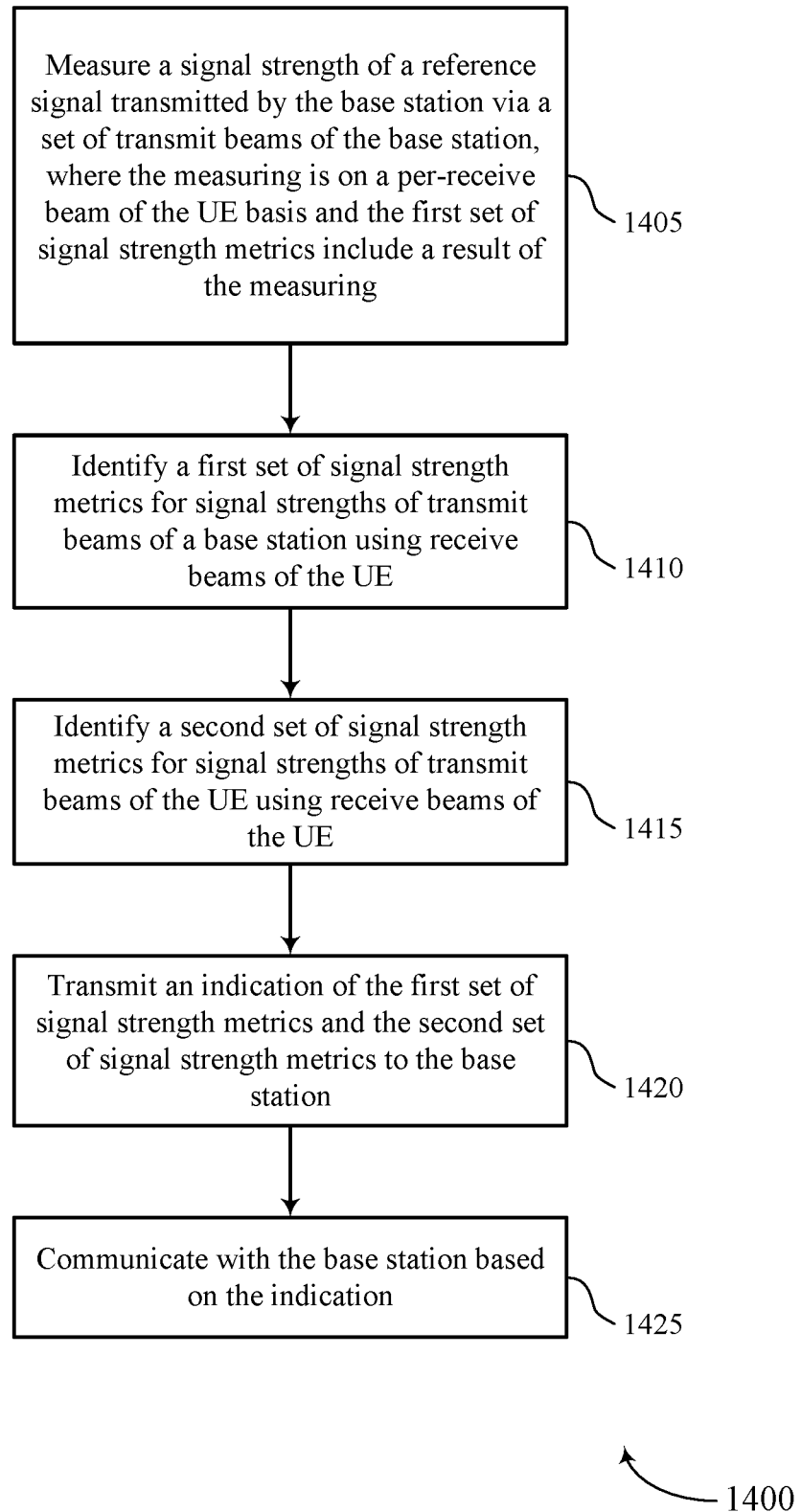

FIG. 14 shows a flowchart illustrating a method 1400 that supports measurement reporting for full-duplex multi-beam communications in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may measure a signal strength of a reference signal transmitted by the base station via a set of transmit beams of the base station, where the measuring is on a per-receive beam of the UE basis and the first set of signal strength metrics include a result of the measuring. The operations of 1405 may be performed according to the methods described herein. In some examples, aspects of the operations of 1405 may be performed by a base station interference determination manager as described with reference to FIGS. 5 through 8.

At 1410, the UE may identify a first set of signal strength metrics for signal strengths of transmit beams of a base station using receive beams of the UE. The operations of 1410 may be performed according to the methods described herein. In some examples, aspects of the operations of 1410 may be performed by a base station interference manager as described with reference to FIGS. 5 through 8.

At 1415, the UE may identify a second set of signal strength metrics for signal strengths of transmit beams of the UE using receive beams of the UE. The operations of 1415 may be performed according to the methods described herein. In some examples, aspects of the operations of 1415 may be performed by a UE self-interference manager as described with reference to FIGS. 5 through 8.

At 1420, the UE may transmit an indication of the first set of signal strength metrics and the second set of signal strength metrics to the base station. The operations of 1420 may be performed according to the methods described herein. In some examples, aspects of the operations of 1420 may be performed by a table indication manager as described with reference to FIGS. 5 through 8.

At 1425, the UE may communicate with the base station based on the indication. The operations of 1425 may be performed according to the methods described herein. In some examples, aspects of the operations of 1425 may be performed by an interference communication manager as described with reference to FIGS. 5 through 8.

Figure 15:
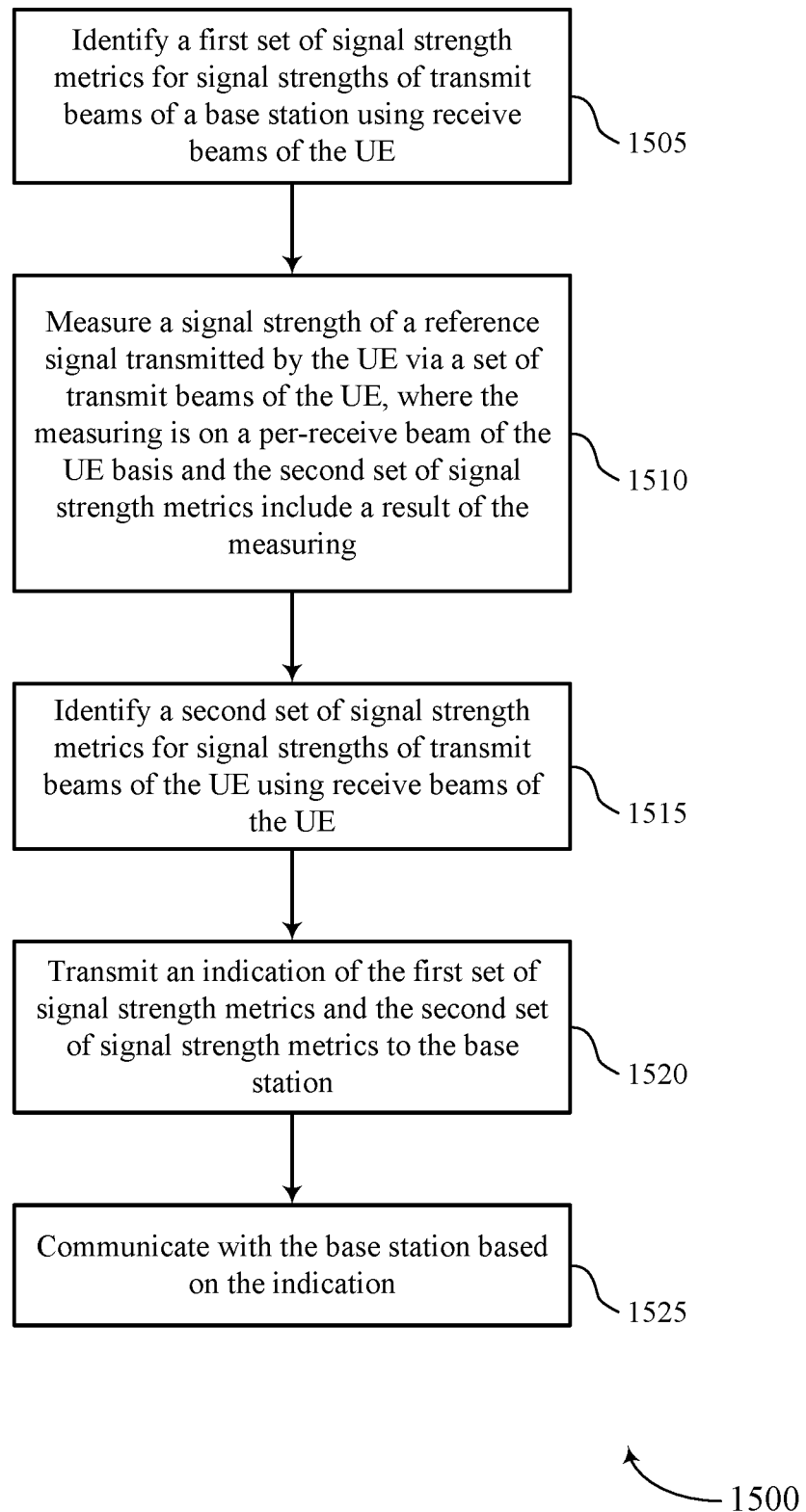

FIG. 15 shows a flowchart illustrating a method 1500 that supports measurement reporting for full-duplex multi-beam communications in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a first set of signal strength metrics for signal strengths of transmit beams of a base station using receive beams of the UE. The operations of 1505 may be performed according to the methods described herein. In some examples, aspects of the operations of 1505 may be performed by a base station interference manager as described with reference to FIGS. 5 through 8.

At 1510, the UE may measure a signal strength of a reference signal transmitted by the UE via a set of transmit beams of the UE, where the measuring is on a per-receive beam of the UE basis and the second set of signal strength metrics include a result of the measuring. The operations of 1510 may be performed according to the methods described herein. In some examples, aspects of the operations of 1510 may be performed by a UE self-interference determination manager as described with reference to FIGS. 5 through 8.

At 1515, the UE may identify a second set of signal strength metrics for signal strengths of transmit beams of the UE using receive beams of the UE. The operations of 1515 may be performed according to the methods described herein. In some examples, aspects of the operations of 1515 may be performed by a UE self-interference manager as described with reference to FIGS. 5 through 8.

At 1520, the UE may transmit an indication of the first set of signal strength metrics and the second set of signal strength metrics to the base station. The operations of 1520 may be performed according to the methods described herein. In some examples, aspects of the operations of 1520 may be performed by a table indication manager as described with reference to FIGS. 5 through 8.

At 1525, the UE may communicate with the base station based on the indication. The operations of 1525 may be performed according to the methods described herein. In some examples, aspects of the operations of 1525 may be performed by an interference communication manager as described with reference to FIGS. 5 through 8.

Figure 16:
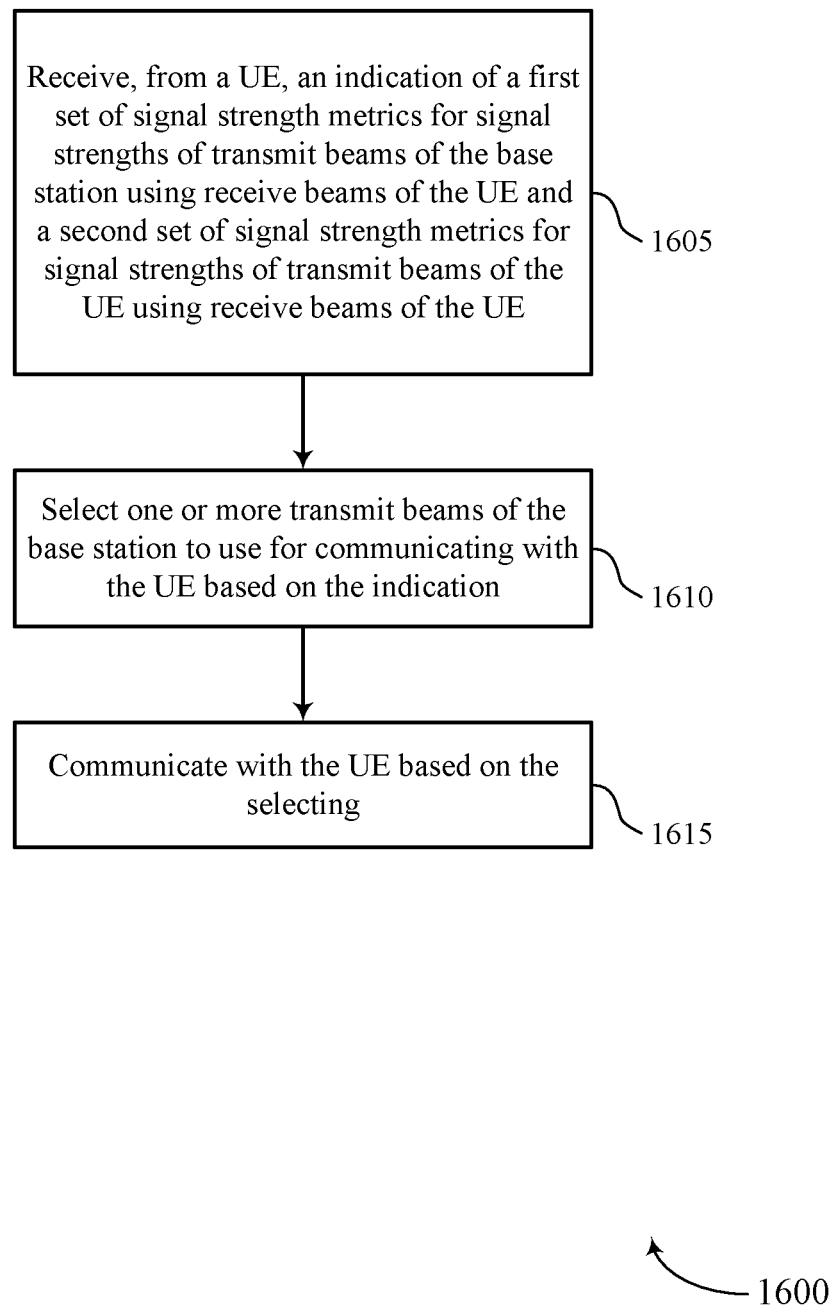

FIG. 16 shows a flowchart illustrating a method 1600 that supports measurement reporting for full-duplex multi-beam communications in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive, from a UE, an indication of a first set of signal strength metrics for signal strengths of transmit beams of the base station using receive beams of the UE and a second set of signal strength metrics for signal strengths of transmit beams of the UE using receive beams of the UE. The operations of 1605 may be performed according to the methods described herein. In some examples, aspects of the operations of 1605 may be performed by a table indication manager as described with reference to FIGS. 9 through 12.

At 1610, the base station may select one or more transmit beams of the base station to use for communicating with the UE based on the indication. The operations of 1610 may be performed according to the methods described herein. In some examples, aspects of the operations of 1610 may be performed by an interference communication manager as described with reference to FIGS. 9 through 12.

At 1615, the base station may communicate with the UE based on the selecting. The operations of 1615 may be performed according to the methods described herein. In some examples, aspects of the operations of 1615 may be performed by an interference communication manager as described with reference to FIGS. 9 through 12.

Figure 17:
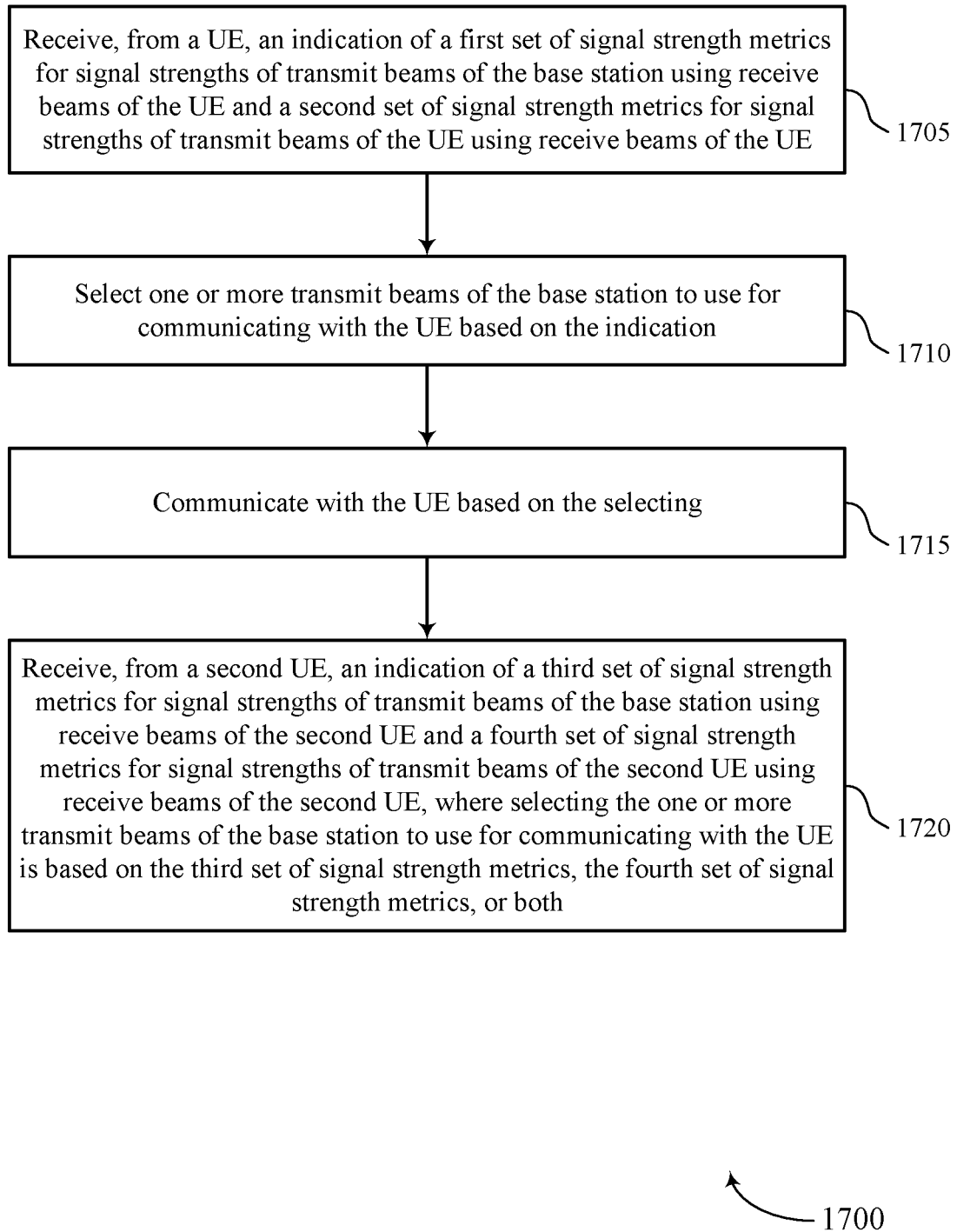

FIG. 17 shows a flowchart illustrating a method 1700 that supports measurement reporting for full-duplex multi-beam communications in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, an indication of a first set of signal strength metrics for signal strengths of transmit beams of the base station using receive beams of the UE and a second set of signal strength metrics for signal strengths of transmit beams of the UE using receive beams of the UE. The operations of 1705 may be performed according to the methods described herein. In some examples, aspects of the operations of 1705 may be performed by a table indication manager as described with reference to FIGS. 9 through 12.

At 1710, the base station may select one or more transmit beams of the base station to use for communicating with the UE based on the indication. The operations of 1710 may be performed according to the methods described herein. In some examples, aspects of the operations of 1710 may be performed by an interference communication manager as described with reference to FIGS. 9 through 12.

At 1715, the base station may communicate with the UE based on the selecting. The operations of 1715 may be performed according to the methods described herein. In some examples, aspects of the operations of 1715 may be performed by an interference communication manager as described with reference to FIGS. 9 through 12.

At 1720, the base station may receive, from a second UE, an indication of a third set of signal strength metrics for signal strengths of transmit beams of the base station using receive beams of the second UE and a fourth set of signal strength metrics for signal strengths of transmit beams of the second UE using receive beams of the second UE, where selecting the one or more transmit beams of the base station to use for communicating with the UE is based on the third set of signal strength metrics, the fourth set of signal strength metrics, or both. The operations of 1720 may be performed according to the methods described herein. In some examples, aspects of the operations of 1720 may be performed by a multi-UE interference manager as described with reference to FIGS. 9 through 12.

The following provides an overview of aspects of the present disclosure:

Aspect 1: A method for wireless communication at a UE, comprising: identifying a first set of signal strength metrics for signal strengths of transmit beams of a base station using receive beams of the UE; identifying a second set of signal strength metrics for signal strengths of transmit beams of the UE using receive beams of the UE; transmitting an indication of the first set of signal strength metrics and the second set of signal strength metrics to the base station; and communicating with the base station based at least in part on the indication.

Aspect 2: The method of aspect 1, further comprising: measuring a signal strength of a reference signal transmitted by the base station via a set of transmit beams of the base station, wherein the measuring is on a per-receive beam of the UE basis and the first set of signal strength metrics comprise a result of the measuring.

Aspect 3: The method of aspect 2, further comprising: receiving, from the base station, a configuration signal identifying reference signal resources for the reference signal transmissions by the base station.

Aspect 4: The method of any of aspects 1 through 3, further comprising: measuring a signal strength of a reference signal transmitted by the UE via a set of transmit beams of the UE, wherein the measuring is on a per-receive beam of the UE basis and the second set of signal strength metrics comprise a result of the measuring.

Aspect 5: The method of aspect 4, further comprising: receiving, from the base station, a configuration signal identifying resources for the reference signal transmissions by the UE.

Aspect 6: The method of any of aspects 1 through 5, further comprising: generating a base station-to-UE interference table comprising a respective signal strength of a set of transmit beams of the base station for a set of receive beams of the UE; and generating a UE self-interference table comprising a respective signal strength of a set of transmit beams of the UE for the set of receive beams of the UE, wherein the indication of the first set of signal strength metrics comprises information associated with the base station-to-UE interference table and the UE self-interference table.

Aspect 7: The method of aspect 6, wherein the information associated with the base station-to-UE interference table and the UE self-interference table comprises the respective signal strengths.

Aspect 8: The method of any of aspects 6 through 7, wherein the information associated with the base station-to-UE interference table and the UE self-interference table comprises a respective indication, for each base station transmit beam-to-UE receive beam combination of the base station-to-UE interference table, for each UE transmit beam-to-UE receive beam combination of the UE self-interference table, or both, of whether the respective signal strength satisfies a threshold.

Aspect 9: The method of any of aspects 6 through 7, wherein the information associated with the base station-to-UE interference table and the UE self-interference table comprises a respective indication for any base station transmit beam-to-UE receive beam combination of the base station-to-UE interference table, for any UE transmit beam-to-UE receive beam combination of the UE self-interference table, or both, associated with a signal strength that fails to satisfy a threshold.

Aspect 10: A method for wireless communication at a base station, comprising: receiving, from a UE, an indication of a first set of signal strength metrics for signal strengths of transmit beams of the base station using receive beams of the UE and a second set of signal strength metrics for signal strengths of transmit beams of the UE using receive beams of the UE; selecting one or more transmit beams of the base station to use for communicating with the UE based at least in part on the indication; and communicating with the UE based at least in part on the selecting.

Aspect 11: The method of aspect 10, further comprising: determining, based at least in part on the first set of signal strength metrics, a signal strength of a reference signal transmitted by the base station using a set of transmit beams of the base station, wherein the signal strength is on a per-receive beam of the UE basis.

Aspect 12: The method of aspect 11, further comprising: transmitting a configuration signal identifying reference signal resources for the reference signal transmissions by the base station.

Aspect 13: The method of any of aspects 10 through 12, further comprising: determining, based at least in part on the second set of signal strength metrics, a signal strength of a reference signal transmitted by the UE using a set of transmit beams of the UE, wherein the signal strength is on a per-receive beam of the UE basis.

Aspect 14: The method of aspect 13, further comprising: transmitting, to the UE, a configuration signal identifying resources for the reference signal transmissions by the UE.

Aspect 15: The method of any of aspects 10 through 14, further comprising: generating, based at least in part on the first set of signal strength metrics, a base station-to-UE interference table comprising a respective signal strength of a set of transmit beams of the base station for a set of receive beams of the UE; and generating, based at least in part on the second set of signal strength metrics, a UE self-interference table comprising a respective signal strength of a set of transmit beams of the UE for the set of receive beams of the UE.

Aspect 16: The method of aspect 15, wherein the indication comprises the respective signal strengths associated with the base station-to-UE interference table and the UE self-interference table.

Aspect 17: The method of any of aspects 15 through 16, wherein the indication comprises a respective indication of whether a signal strength associated with each base station transmit beam-to-UE receive beam combination of the combination of the base station-to-UE interference table, each UE transmit beam-to-UE receive beam combination of the UE self-interference table, or both, satisfies a threshold.

Aspect 18: The method of any of aspects 15 through 16, wherein the indication comprises a respective indication for any base station transmit beam-to-UE receive beam combination of the combination of the base station-to-UE interference table, for any UE transmit beam-to-UE receive beam combination of the UE self-interference table, or both, associated with a signal strength that fails to satisfy a threshold.

Aspect 19: The method of any of aspects 10 through 18, further comprising: receiving, from a second UE, an indication of a third set of signal strength metrics for signal strengths of transmit beams of the base station using receive beams of the second UE and a fourth set of signal strength metrics for signal strengths of transmit beams of the second UE using receive beams of the second UE, wherein selecting the one or more transmit beams of the base station to use for communicating with the UE is based at least in part on the third set of signal strength metrics, the fourth set of signal strength metrics, or both.

Aspect 20: An apparatus for wireless communication at a UE, comprising a processor; memory coupled with the processor; and instructions stored in the memory and executable by the processor to cause the apparatus to perform a method of any of aspects 1 through 9.

Aspect 21: An apparatus for wireless communication at a UE, comprising at least one means for performing a method of any of aspects 1 through 9.

Aspect 22: A non-transitory computer-readable medium storing code for wireless communication at a UE, the code comprising instructions executable by a processor to perform a method of any of aspects 1 through 9.

Aspect 23: An apparatus for wireless communication at a base station, comprising a processor; memory coupled with the processor; and instructions stored in the memory and executable by the processor to cause the apparatus to perform a method of any of aspects 10 through 19.

Aspect 24: An apparatus for wireless communication at a base station, comprising at least one means for performing a method of any of aspects 10 through 19.

Aspect 25: A non-transitory computer-readable medium storing code for wireless communication at a base station, the code comprising instructions executable by a processor to perform a method of any of aspects 10 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a first set of signal strength metrics for signal strengths of transmit beams of a network device using receive beams of the UE;
   identifying a second set of signal strength metrics for signal strengths of transmit beams of the UE using receive beams of the UE;
   transmitting an indication of the first set of signal strength metrics and the second set of signal strength metrics to the network device; and
   communicating with the network device based at least in part on the indication.

2. The method of claim 1, further comprising:
   measuring a signal strength of a reference signal transmitted by the network device via a set of transmit beams of the network device, wherein the measuring is on a per-receive beam of the UE basis and the first set of signal strength metrics comprise a result of the measuring.

3. The method of claim 2, further comprising:
   receiving, from the network device, a configuration signal identifying reference signal resources for the reference signal transmissions by the network device.

4. The method of claim 1, further comprising:
   measuring a signal strength of a reference signal transmitted by the UE via a set of transmit beams of the UE, wherein the measuring is on a per-receive beam of the UE basis and the second set of signal strength metrics comprise a result of the measuring.

5. The method of claim 4, further comprising:
   receiving, from the network device, a configuration signal identifying resources for the reference signal transmissions by the UE.

6. The method of claim 1, further comprising:
   generating a network device-to-UE interference table comprising a respective signal strength of a set of transmit beams of the network device for a set of receive beams of the UE; and
   generating a UE self-interference table comprising a respective signal strength of a set of transmit beams of the UE for the set of receive beams of the UE, wherein the indication of the first set of signal strength metrics comprises information associated with the network device-to-UE interference table and the UE self-interference table.

7. The method of claim 6, wherein the information associated with the network device-to-UE interference table and the UE self-interference table comprises the respective signal strengths.

8. The method of claim 6, wherein the information associated with the network device-to-UE interference table and the UE self-interference table comprises a respective indication, for each network device transmit beam-to-UE receive beam combination of the network device-to-UE interference table, for each UE transmit beam-to-UE receive beam combination of the UE self-interference table, or both, of whether the respective signal strength satisfies a threshold.

9. The method of claim 6, wherein the information associated with the network device-to-UE interference table and the UE self-interference table comprises a respective indication for any network device transmit beam-to-UE receive beam combination of the network device-to-UE interference table, for any UE transmit beam-to-UE receive beam combination of the UE self-interference table, or both, associated with a signal strength that fails to satisfy a threshold.

10. A method for wireless communication at a network device, comprising:
receiving, from a user equipment (UE), an indication of a first set of signal strength metrics for signal strengths of transmit beams of the network device using receive beams of the UE and a second set of signal strength metrics for signal strengths of transmit beams of the UE using receive beams of the UE;
selecting one or more transmit beams of the network device to use for communicating with the UE based at least in part on the indication; and
communicating with the UE based at least in part on the selecting.

11. The method of claim 10, further comprising:
determining, based at least in part on the first set of signal strength metrics, a signal strength of a reference signal transmitted by the network device using a set of transmit beams of the network device, wherein the signal strength is on a per-receive beam of the UE basis.

12. The method of claim 11, further comprising:
transmitting a configuration signal identifying reference signal resources for the reference signal transmissions by the network device.

13. The method of claim 10, further comprising:
determining, based at least in part on the second set of signal strength metrics, a signal strength of a reference signal transmitted by the UE using a set of transmit beams of the UE, wherein the signal strength is on a per-receive beam of the UE basis.

14. The method of claim 13, further comprising:
transmitting, to the UE, a configuration signal identifying resources for the reference signal transmissions by the UE.

15. The method of claim 10, further comprising:
generating, based at least in part on the first set of signal strength metrics, a network device-to-UE interference table comprising a respective signal strength of a set of transmit beams of the network device for a set of receive beams of the UE; and
generating, based at least in part on the second set of signal strength metrics, a UE self-interference table comprising a respective signal strength of a set of transmit beams of the UE for the set of receive beams of the UE.

16. The method of claim 15, wherein the indication comprises the respective signal strengths associated with the network device-to-UE interference table and the UE self-interference table.

17. The method of claim 15, wherein the indication comprises a respective indication of whether a signal strength associated with each network device transmit beam-to-UE receive beam combination of the combination of the network device-to-UE interference table, each UE transmit beam-to-UE receive beam combination of the UE self-interference table, or both, satisfies a threshold.

18. The method of claim 15, wherein the indication comprises a respective indication for any network device transmit beam-to-UE receive beam combination of the combination of the network device-to-UE interference table, for any UE transmit beam-to-UE receive beam combination of the UE self-interference table, or both, associated with a signal strength that fails to satisfy a threshold.

19. The method of claim 10, further comprising:
receiving, from a second UE, an indication of a third set of signal strength metrics for signal strengths of transmit beams of the network device using receive beams of the second UE and a fourth set of signal strength metrics for signal strengths of transmit beams of the second UE using receive beams of the second UE, wherein selecting the one or more transmit beams of the network device to use for communicating with the UE is based at least in part on the third set of signal strength metrics, the fourth set of signal strength metrics, or both.

20. An apparatus for wireless communication at a user equipment (UE), comprising:
a processor,
memory coupled with the processor; and
instructions stored in the memory and executable by the processor to cause the apparatus to:
identify a first set of signal strength metrics for signal strengths of transmit beams of a network device using receive beams of the UE;
identify a second set of signal strength metrics for signal strengths of transmit beams of the UE using receive beams of the UE;
transmit an indication of the first set of signal strength metrics and the second set of signal strength metrics to the network device; and
communicate with the network device based at least in part on the indication.

21. The apparatus of claim 20, wherein the instructions are further executable by the processor to cause the apparatus to:
measure a signal strength of a reference signal transmitted by the network device via a set of transmit beams of the network device, wherein the measuring is on a per-receive beam of the UE basis and the first set of signal strength metrics comprise a result of the measuring.

22. The apparatus of claim 21, wherein the instructions are further executable by the processor to cause the apparatus to:
receive, from the network device, a configuration signal identifying reference signal resources for the reference signal transmissions by the network device.

23. The apparatus of claim 20, wherein the instructions are further executable by the processor to cause the apparatus to:
measure a signal strength of a reference signal transmitted by the UE via a set of transmit beams of the UE, wherein the measuring is on a per-receive beam of the UE basis and the second set of signal strength metrics comprise a result of the measuring.

24. The apparatus of claim 23, wherein the instructions are further executable by the processor to cause the apparatus to:
receive, from the network device, a configuration signal identifying resources for the reference signal transmissions by the UE.

25. The apparatus of claim 20, wherein the instructions are further executable by the processor to cause the apparatus to:
generate a network device-to-UE interference table comprising a respective signal strength of a set of transmit beams of the network device for a set of receive beams of the UE; and
generate a UE self-interference table comprising a respective signal strength of a set of transmit beams of the UE for the set of receive beams of the UE, wherein the indication of the first set of signal strength metrics comprises information associated with the network device-to-UE interference table and the UE self-interference table.

26. An apparatus for wireless communication at a network device, comprising:
a processor,
memory coupled with the processor; and
instructions stored in the memory and executable by the processor to cause the apparatus to:
receive, from a user equipment (UE), an indication of a first set of signal strength metrics for signal strengths of transmit beams of the network device using receive beams of the UE and a second set of signal strength metrics for signal strengths of transmit beams of the UE using receive beams of the UE;
select one or more transmit beams of the network device to use for communicating with the UE based at least in part on the indication; and
communicate with the UE based at least in part on the selecting.

27. The apparatus of claim 26, wherein the instructions are further executable by the processor to cause the apparatus to:
determine, based at least in part on the first set of signal strength metrics, a signal strength of a reference signal transmitted by the network device using a set of transmit beams of the network device, wherein the signal strength is on a per-receive beam of the UE basis.

28. The apparatus of claim 26, wherein the instructions are further executable by the processor to cause the apparatus to:
determine, based at least in part on the second set of signal strength metrics, a signal strength of a reference signal transmitted by the UE using a set of transmit beams of the UE, wherein the signal strength is on a per-receive beam of the UE basis.

29. The apparatus of claim 26, wherein the instructions are further executable by the processor to cause the apparatus to:
generate, based at least in part on the first set of signal strength metrics, a network device-to-UE interference table comprising a respective signal strength of a set of transmit beams of the network device for a set of receive beams of the UE; and
generate, based at least in part on the second set of signal strength metrics, a UE self-interference table comprising a respective signal strength of a set of transmit beams of the UE for the set of receive beams of the UE.

30. The apparatus of claim 29, wherein the indication comprises the respective signal strengths associated with the network device-to-UE interference table and the UE self-interference table.

* * * * *